INVENTOR
J. K. MIDDAUGH
BY A. M. Hassell
ATTORNEY

AUTOMATIC SERVICE OBSERVER-RECORDER CIRCUITS

Filed April 22, 1958

18 Sheets-Sheet 2

INVENTOR
J. K. MIDDAUGH
BY
A. M. Hassell
ATTORNEY

AUTOMATIC SERVICE OBSERVER-RECORDER CIRCUITS

Filed April 22, 1958 18 Sheets-Sheet 3

INVENTOR
J. K. MIDDAUGH
BY A. M. Hassell
ATTORNEY

INVENTOR
J. K. MIDDAUGH
BY A. M. Hassell
ATTORNEY

April 25, 1961 J. K. MIDDAUGH 2,981,806

AUTOMATIC SERVICE OBSERVER-RECORDER CIRCUITS

Filed April 22, 1958 18 Sheets-Sheet 5

INVENTOR
J. K. MIDDAUGH
BY
A. M. Hassell
ATTORNEY

INVENTOR
J. K. MIDDAUGH
BY A. M. Hassell
ATTORNEY

INVENTOR
J. K. MIDDAUGH
BY A. M. Hassell
ATTORNEY

April 25, 1961 J. K. MIDDAUGH 2,981,806

AUTOMATIC SERVICE OBSERVER-RECORDER CIRCUITS

Filed April 22, 1958

18 Sheets-Sheet 8

INVENTOR
J. K. MIDDAUGH

BY A. M. Hassell

ATTORNEY

AUTOMATIC SERVICE OBSERVER-RECORDER CIRCUITS

Filed April 22, 1958 18 Sheets-Sheet 9

INVENTOR
J. K. MIDDAUGH
BY
A. v. Hassell
ATTORNEY

April 25, 1961 J. K. MIDDAUGH 2,981,806

AUTOMATIC SERVICE OBSERVER-RECORDER CIRCUITS

Filed April 22, 1958 18 Sheets-Sheet 10

INVENTOR
J. K. MIDDAUGH

BY A. M. Hassell

ATTORNEY

April 25, 1961 J. K. MIDDAUGH 2,981,806

AUTOMATIC SERVICE OBSERVER-RECORDER CIRCUITS

Filed April 22, 1958 18 Sheets-Sheet 11

INVENTOR
J. K. MIDDAUGH
BY A. M. Hassell
ATTORNEY

INVENTOR
J. K. MIDDAUGH
BY
A. M. Hassell
ATTORNEY

April 25, 1961 J. K. MIDDAUGH 2,981,806

AUTOMATIC SERVICE OBSERVER-RECORDER CIRCUITS

Filed April 22, 1958 18 Sheets-Sheet 13

INVENTOR
J. K. MIDDAUGH
BY A. M. Hassell
ATTORNEY

INVENTOR
J. K. MIDDAUGH
BY A. M. Hassell
ATTORNEY

April 25, 1961 J. K. MIDDAUGH 2,981,806

AUTOMATIC SERVICE OBSERVER-RECORDER CIRCUITS

Filed April 22, 1958 18 Sheets-Sheet 15

INVENTOR
J K MIDDAUGH
BY
A.M. Hassell
ATTORNEY

INVENTOR
J. K. MIDDAUGH
BY
A. M. Hassell
ATTORNEY

INVENTOR
J. K. MIDDAUGH
BY A. M. Hassell
ATTORNEY

INVENTOR
J. K. MIDDAUGH
BY Walter M. Hill
ATTORNEY 2,981,806

AUTOMATIC SERVICE OBSERVER-RECORDER CIRCUITS

Jack K. Middaugh, Metuchen, N.J., assignor to Bell Telephone Laboratories, Incorporated, New York, N.Y., a corporation of New York Filed Apr. 22, 1958, Ser. No. 730,179

4 Claims. (Cl. 179—175.2)

This invention relates to apparatus for observing electrical phenomena. Although the principles underlying the invention may have wide application in a variety of devices, the particular illustrative embodiment herein selected for description of the invention comprises a telephone service observer-recorder.

Telephone circuits occasionally operate improperly because of the malfunctioning of switching apparatus, the failure of components, mistakes by operators, etc. In order that telephone service may be maintained at the highest practicable level of quality, it has been the practice to periodically observe calls placed through telephone facilities. This has heretofore been done by service observing operators whose duties have included observing calls selected at random from among those passing through the various telephone central offices. Such observation has, however, been necessarily limited due to economic factors resulting from the number of operators required and from the time needed to manually record pertinent items of information.

It is therefore one object of this invention to improve service observing apparatus by permitting a more rapid recording of observed information.

It is another object of this invention to extend the scope of the items observed both with respect to the number thereof and the type.

It is yet another object of this invention to incorporate versatility in the circuits thereof, thereby to permit utilization with existing telephone switching systems.

It is still a further object of this invention to include provision for the permanent recording of observed data in readily usable form.

Accordingly, in accordance with one feature of this invention, apparatus having unique functional characteristics is advantageously employed to respond automatically to the initiation of a call over any one of a predetermined number of customers' lines, to connect itself thereto, and during the course of the call effectively to render itself unresponsive to a calling condition of any of the remainder of the lines within the group.

In accordance with another feature of the invention, a variety of service information items such as the waiting time for dial tone, dialing time, busy condition, et cetera are recognized and automatically recorded on magnetic tape in readily usable binary code form, thereby permitting subsequent rapid and effective utilization thereof.

In accordance with yet another feature of the invention, the service observing and recording apparatus is not released immediately after the termination of a call when the calling party hangs up after having incompletely dialed, after having received a busy or overflow signal, or after having had a wrong number or no answer. Instead, the apparatus remains in an activated condition for a brief period of time to record data relating to a subsequent attempt to complete the call.

In accordance with still another feature of this invention, register and comparison circuits are actuated during the aforementioned brief period of continued activation thereby to check the identity of each customer line over which a call originates and to observe service thereon only if the line is found to be that of the original customer.

In accordance with still a further feature of this invention, both the calling line number and the called party number are registered and recorded, thereby providing a permanent record thereof.

Other objects and features of the invention will be apparent from the following detailed description, by way of example, with reference to the drawing in which.

The specific embodiment of the invention herein disclosed is adapted to operate in cooperative association with line concentrating equipment of the type disclosed in Patent No. 2,812,385, granted to A. E. Joel, Jr., M. E. Krom, and M. Posin on November 5, 1957. As is well known in the art, line concentrating equipment has been devised to reduce the number of individual conductors required for interconnection of customers and the serving central office.

According to the design employed in the aforementioned line concentrating equipment, ten concentrators each serving fifty customers' lines are included in a line concentrator group. Each concentrator is connected to the central office over eleven individual trunks, ten being for connection to customers' lines and one for control. The fifty customer lines each have access through suitable preference circuits to six out of the ten customers' trunks.

The concentrators themselves are individually located each in the physical vicinity of the fifty customers which it serves, thereby permitting the installation of relatively short lines between the subscribers' premises and the concentrators. The trunks, which may be much longer, extend from the concentrators to the central office. Certain equipment, in addition to that located in the vicinity of the customers, is required for control and is physically installed at the local central office. Of this equipment, only those elements which actively cooperate with the hereinafter-described apparatus are shown, these being schematically depicted within the area thus identified in Fig. 1. They, together with remaining elements, are described in the aforementioned patent to which reference may be made for an understanding thereof.

The herein-considered service observer-recorder is adapted for cooperative association with one line concentrator group, that is, with ten individual concentrators each serving fifty customers and each having access to ten customers' trunks. Whenever a call being observed is terminated (except when terminated because of a busy condition, overflow, et cetera as mentioned above), the observing equipment is reset and becomes available for subsequent observation of the next call placed through any one of the concentrators within the group.

Normally, scanning apparatus within the line concentrator central office control equipment emits scanning pulses which are transmitted to the concentrators and there cause the customers' lines to be scanned in repetitive succession. When scanning progresses to a line over which a customer is attempting to place a call, the scanning apparatus recognizes the activated condition thereof and actuates other apparatus which, when operated, connects the activated line to one of the aforementioned customers' trunks. At the time such connection is made, the relay contacts designated HM in Fig. 1 close.

Figures 1, 18:
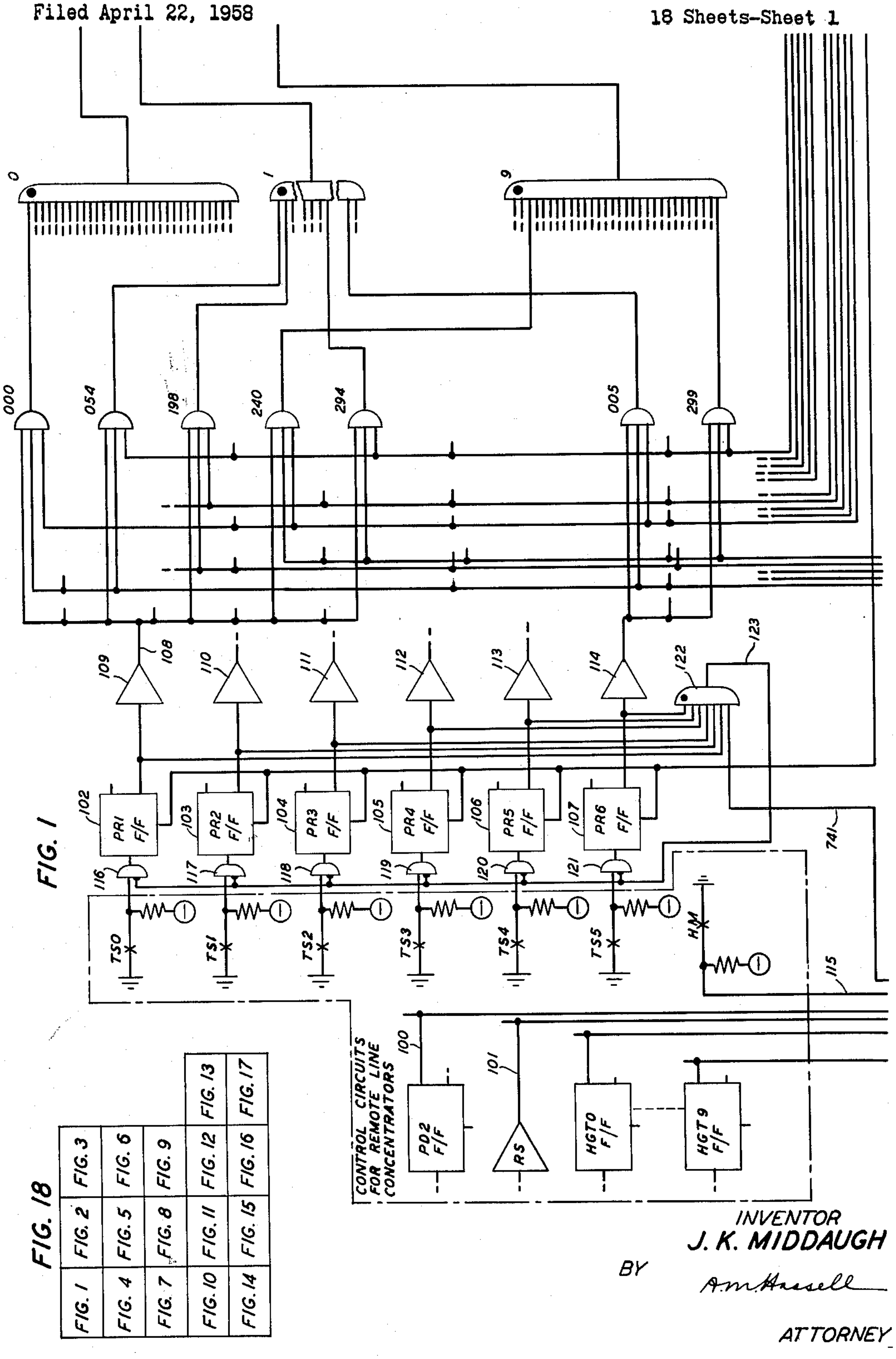
Figs. 1–17 are a schematic diagram of service observing and recording apparatus embodying principles underlying the invention.
Fig. 18 is a diagram depicting the correct physical relationship of Figs. 1–17.

Other elements within the line concentrator control circuits of Fig. 1 operate during each scanning cycle. Each time scanning progresses from one line to the next, a "Vertical File" pulse is generated and applied to lead 100 by flip-flop PD–2; and when all 50 lines have been scanned and the cycle is begun again, a "Reset Pulse" is generated and applied to lead 101. In addition, when scanning progresses to a line over which a request for service originates, the particular one of the ten concentrators to which the line is connected is identified by the switching of the corresponding one of the ten flip-flops HGT0–9, and the particular trunk to which the calling line is subsequently connected is partially identified when one of the six preference relays 102–107 is actuated.

Although each concentrator is connected to ten talking trunks, each customer's line has access to only six thereof, the order of preference being established differently for each line. Thus, whereas one of the lines may have access to trunks 0, 3, 6, 7, 8, and 9 in that order of preference, another line may have access to trunks 7, 0, 8, 6, 3, and 9 in that order, and another may have access to trunks 5, 1, 9, 4, 2, and 0 in that order. Thus, a substantially uniform distribution of calls over the several trunks is ensured.

Suitable logic circuits are provided for the receiving, processing, and registration of a variety of information items relating to each observed call and for recording representations thereof on magnetic tape. For example, the observed calling customer's line identification information is processed in part by registering in flip-flops both the number of the concentrator and the number of the line within the concentrator over which the request for service originates.

While observation is taking place, uniformly spaced timing pulses are generated. When an information item is to be recorded, the timing pulse that would otherwise be recorded is effectively diverted away from the recorder and is instead conducted to translating circuits which convert it to a signal which represents the indicated information. Thus, at the end of each uniformly spaced timing interval, a signal of some kind, i.e., either a timing pulse or an information-representing signal, is registered in the recorder.

For example, when the observer-recorder responds to the initiation of a call and begins observation thereof, a timing pulse generator is activated. The first several timing pulses are not recorded as such but are translated into signals which represent calling customer line identification information. These translated signals are then recorded on the magnetic tape. Thereafter, the timing pulses are themselves recorded on the tape until a signal is received from the concentrator control indicating that a trunk has been connected to the calling line. When this signal is received, the next generated timing pulse is diverted from the magnetic tape recorder and translated to actuate circuits which record a coded signal representing the fact that a trunk has been connected. Timing pulses are then again recorded until the calling customer initiates dialing.

When the first pulse of the initial dialed digit is received, a coded signal representing that fact is recorded, whereupon the recording of timing pulses is resumed and continues while the customer dials. The dialed digits are registered in flip-flop counting chains, and after the last digit has been received, an end-of-dialing coded signal is recorded. The dialed digits are then read out of the counters and representations thereof are sequentially recorded on the magnetic tape.

Time-pulse recording is resumed and continues until ring-back tone is received over the trunk. A corresponding coded signal is then recorded and is followed by timing pulses until the called party answers, whereupon a coded signal representing called-party-answer is recorded.

Time-pulse recording is again resumed and speech-recognizing apparatus is rendered effective to actuate a ten-second timer when speech is received. If, after speech is recognized, a disconnect signal is received before the elapse of ten seconds, the call is deemed to be a questionable one and the apparatus remains partially locked up to await a second call from the same customer during the following sixty seconds. If such subsequent call is not made, the aparatus at the end of sixty seconds completely resets itself.

On the other hand, if the disconnect signal is not received before ten seconds have elapsed subsequent to recognition of speech, the call is not deemed to be questionable, and upon expiration of the ten-second interval, the apparatus resets itself completely.

Suitable coded representations are registered on the magnetic tape when there is no answer, the called line is busy, a number is incompletely dialed or, as mentioned above, when the call is a questionable one. When any one of these occurs, the apparatus is not completely reset in response to customer disconnect but remains in a partially actuated condition to observe a second call by the same party within the following sixty seconds. The concentrator number and subscriber's line number remain registered in the aforementioned flip-flop counters, and an additional group of counters is rendered effective to register similar information relating to calls originating during the sixty-second interval. Matching circuits are provided to compare the concentrator number and customer's line number of the original call with the corresponding numbers of each of the ensuing calls. If a match is found within sixty seconds, the observing apparatus responds by observing service on the matched line and by recording data relating thereto in the normal manner.

Figure 2:
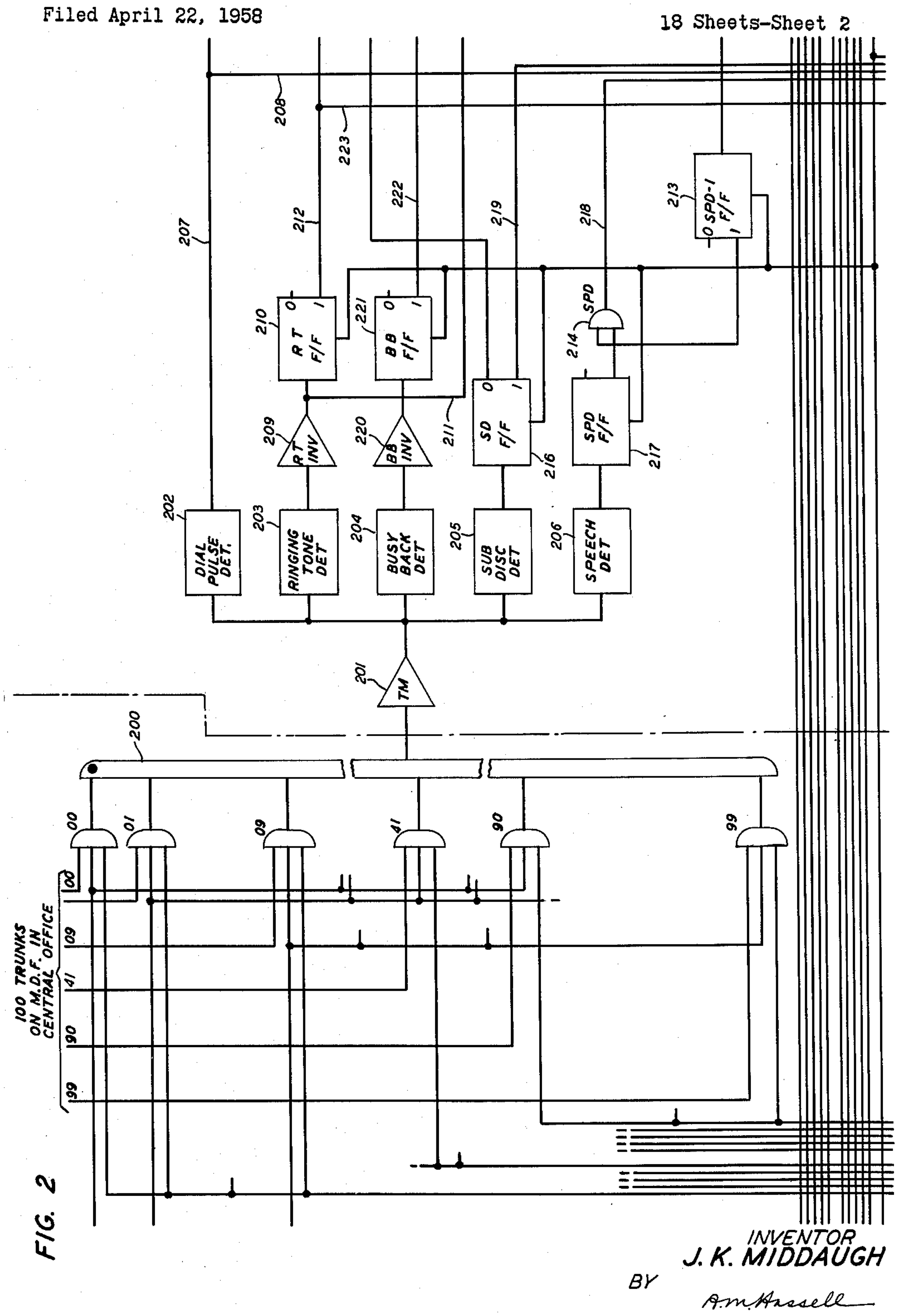
Figure 3:
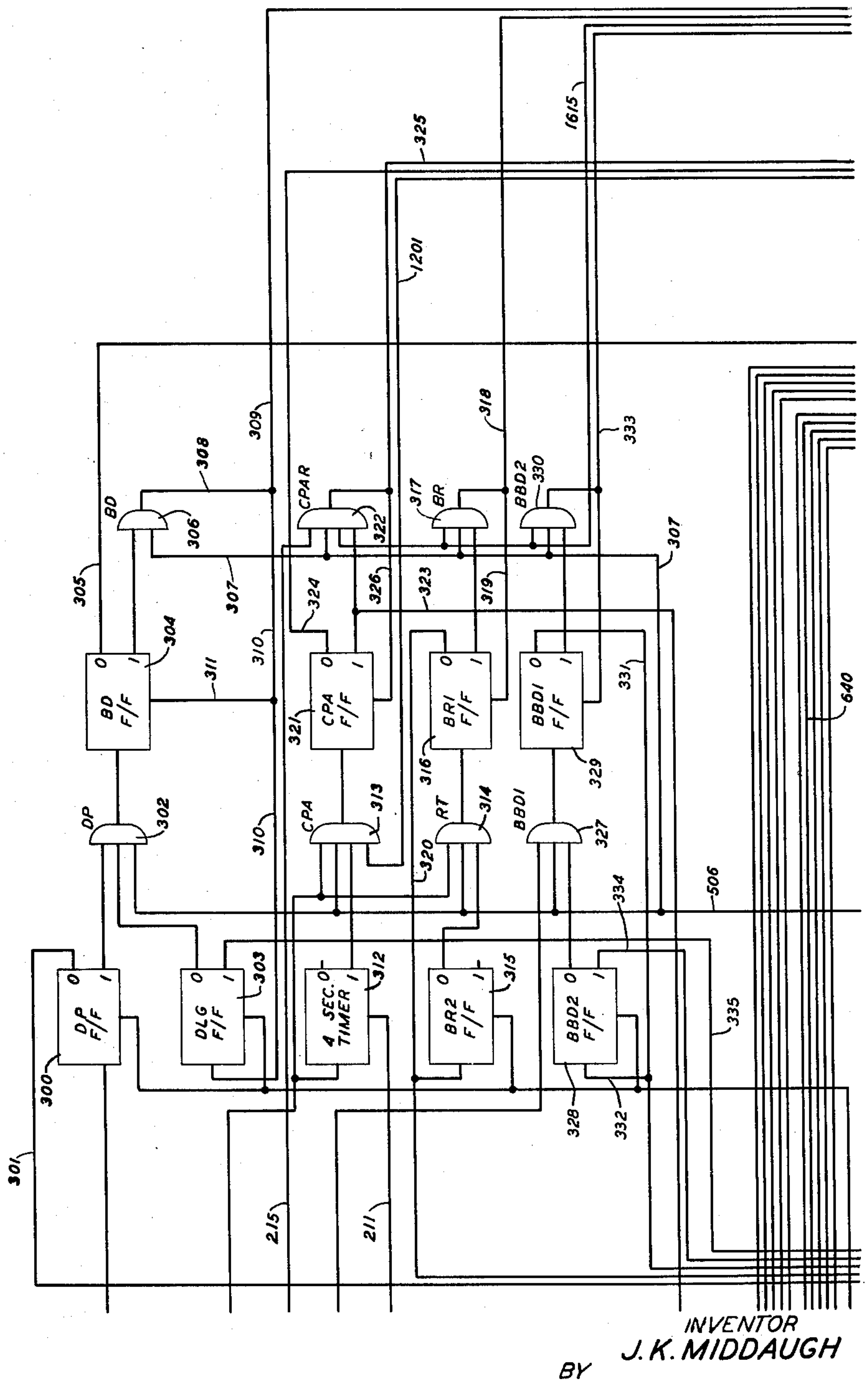
Figure 11:
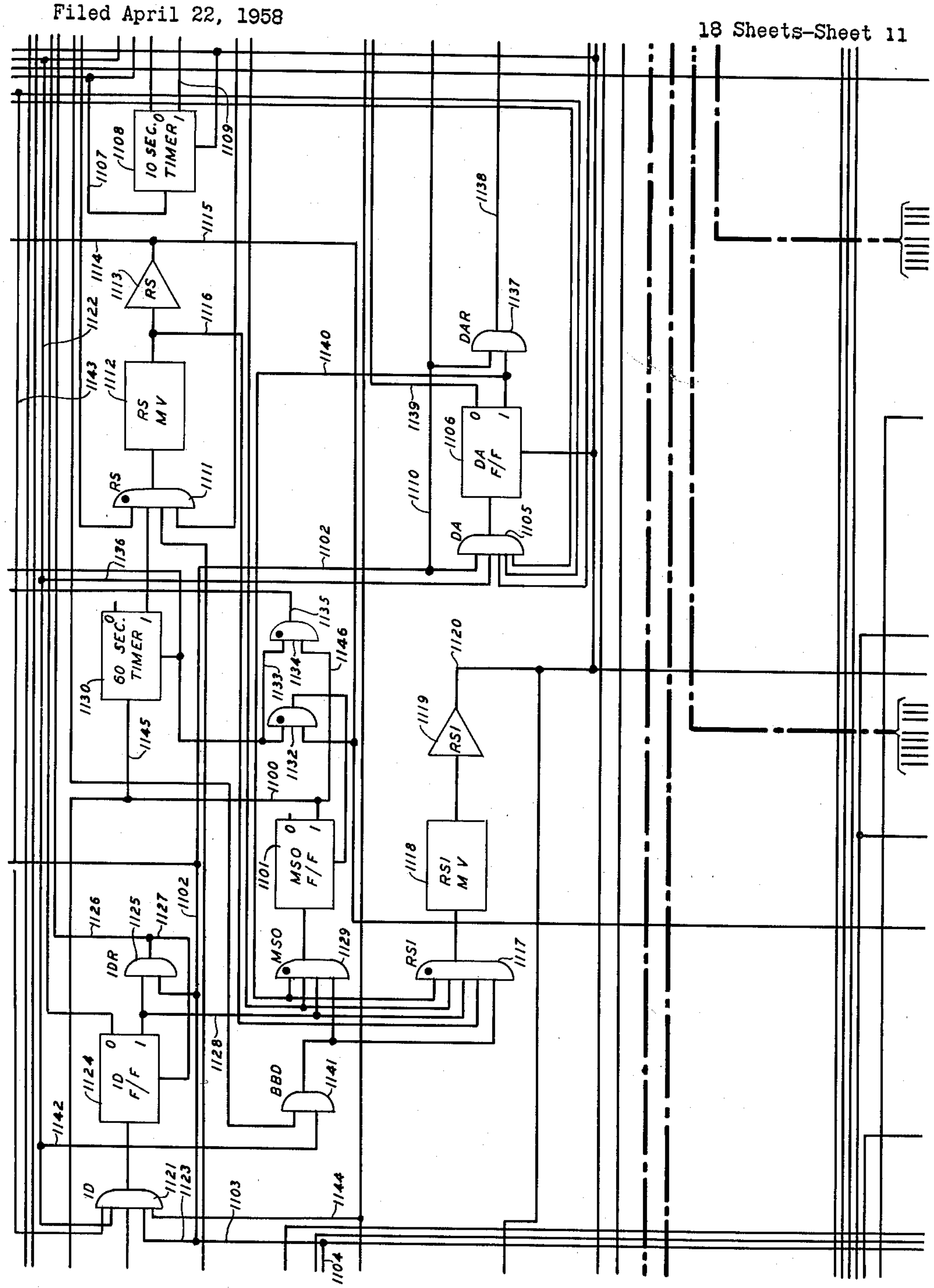
Figure 12:
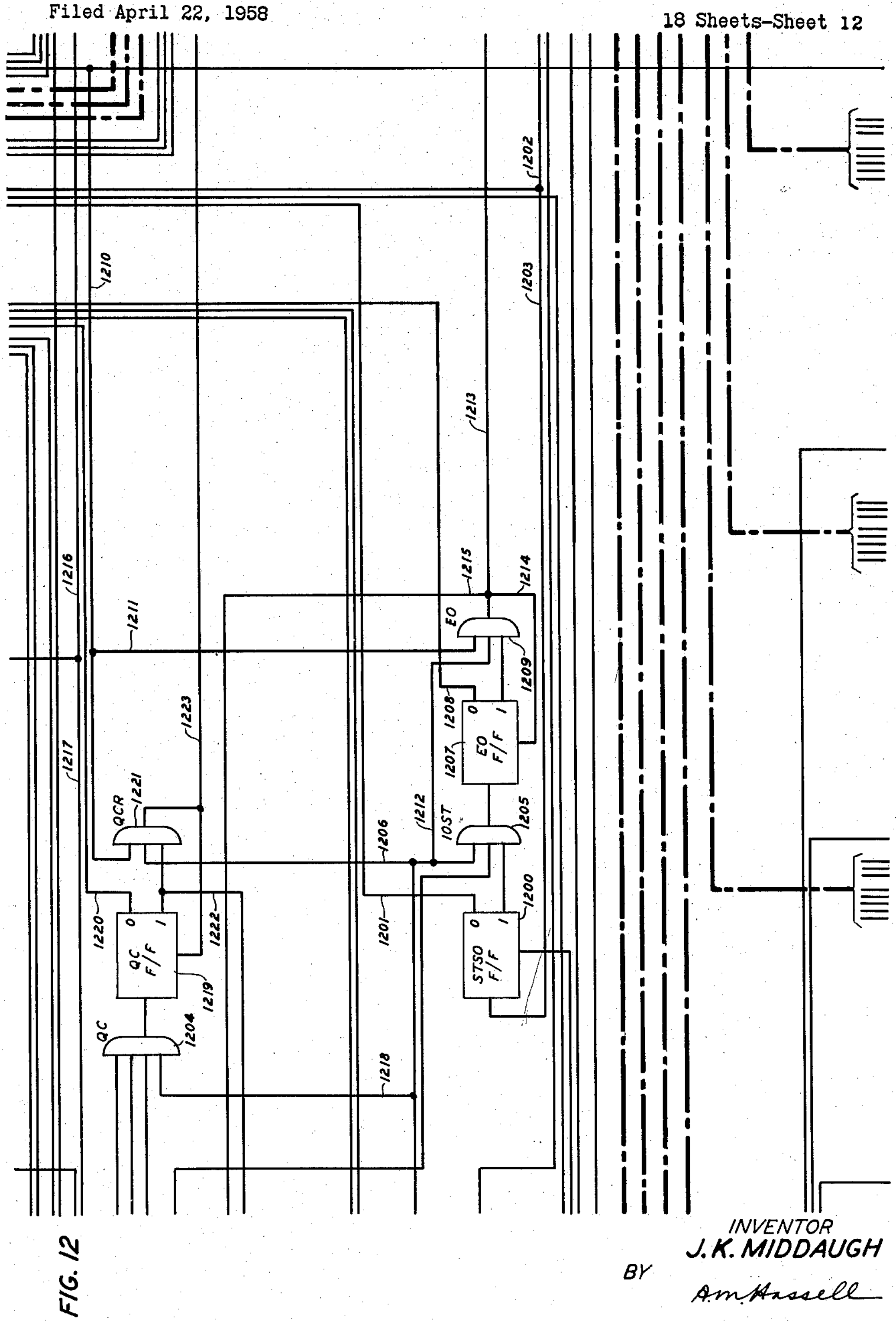
Figure 13:
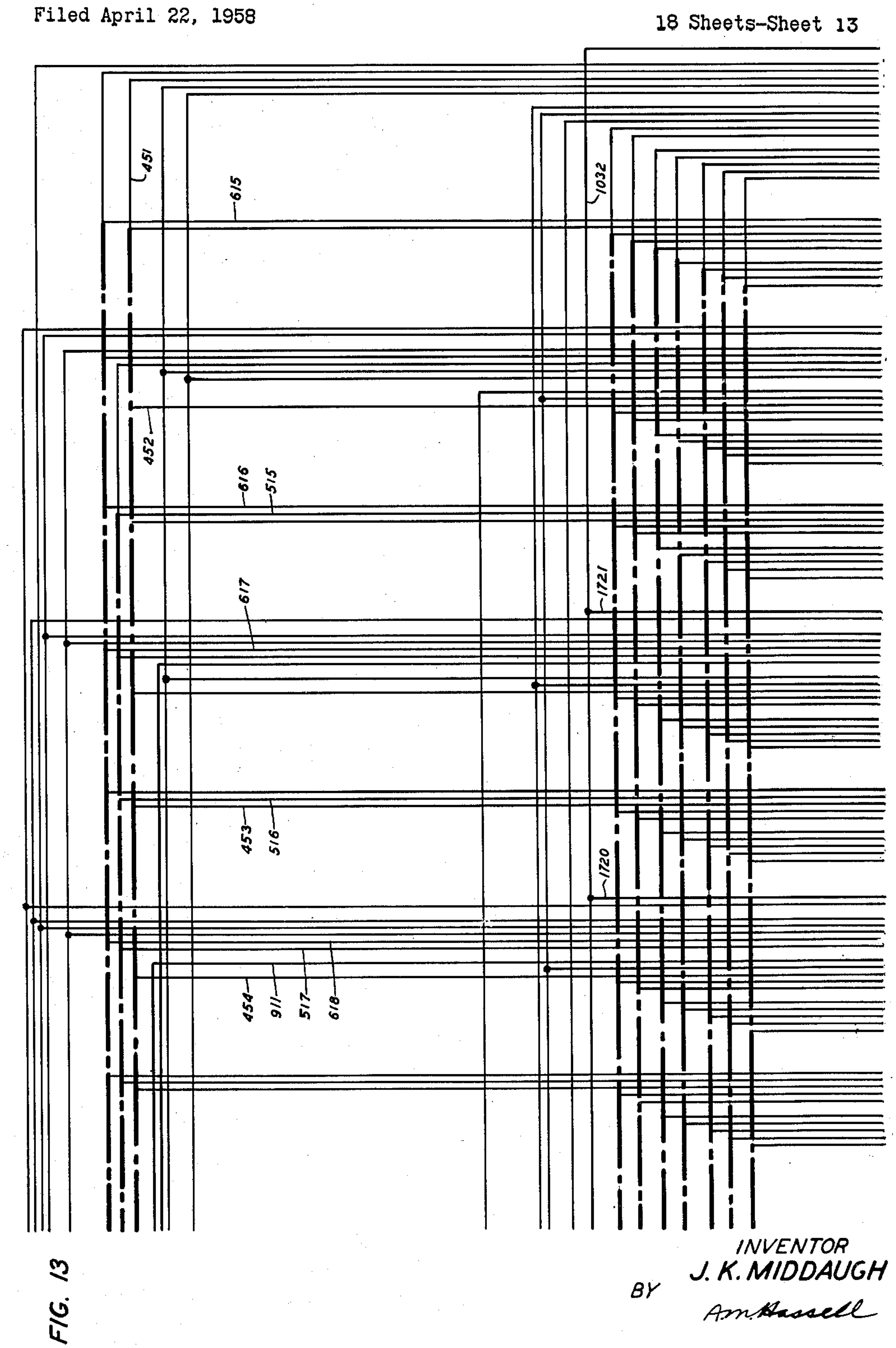
Figure 19:
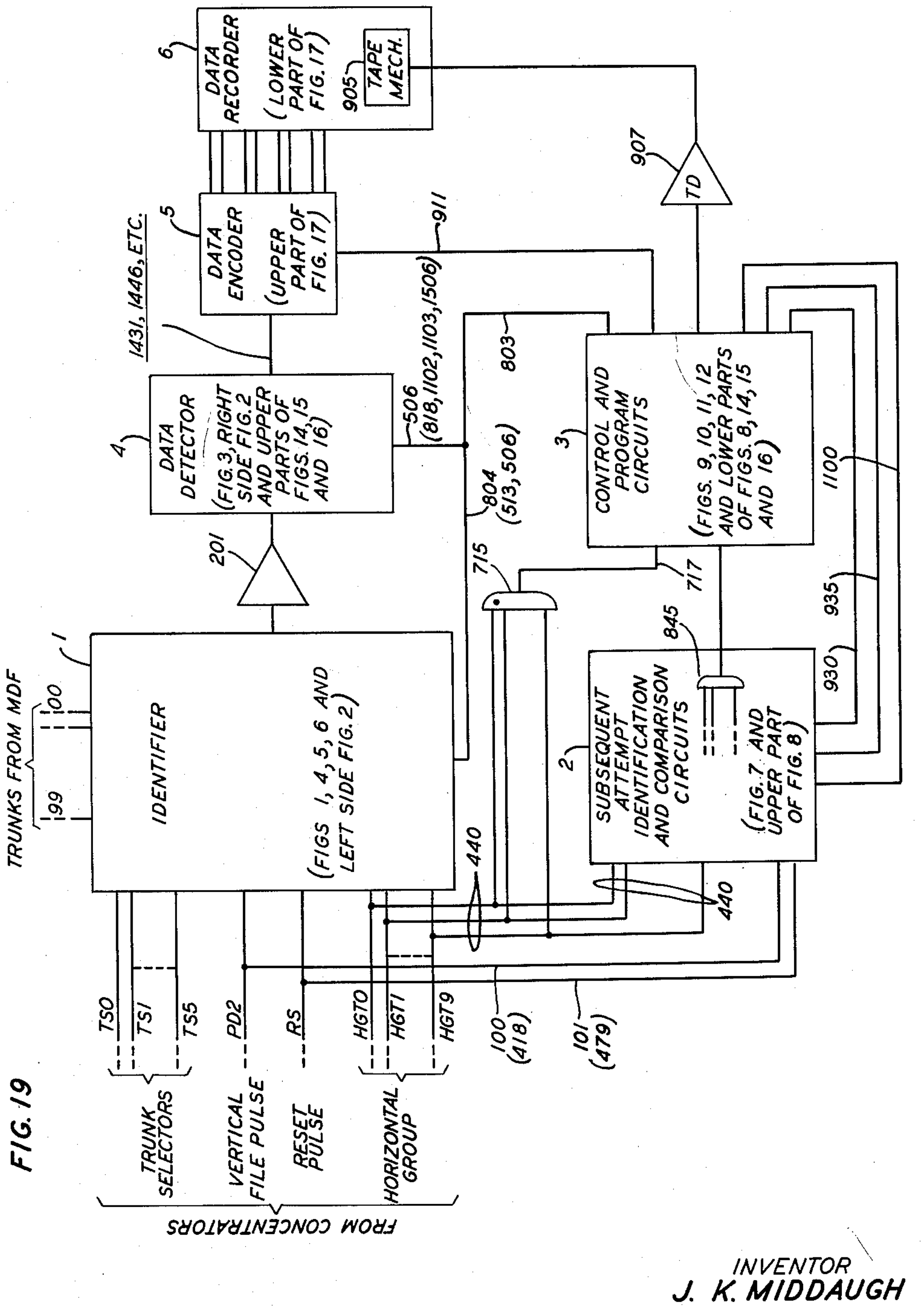
Fig. 19 discloses a simplified block diagram of the embodiment disclosed in Figs. 1 through 17.

Before considering the detailed circuits of Figs. 1 through 17, which together comprise a single illustrative embodiment of the invention, it may be advantageous to refer to the simplified block diagram of Fig. 19. Here the invention embodied in the circuits of Figs. 1 through 17 are shown in block form with the six individual blocks interconnected by only those circuit paths which are necessary to an understanding of the invention in its broad aspects. Before describing the several blocks of Fig. 19, some general observations should be made. The blocks include various portions of the seventeen figures of the complete circuit diagram. For example, block 1 includes Figs. 1, 4, 5, 6 and the left side of Fig. 2. By way of a further example, block 6 comprises the lower part of Fig. 17 and the tape mechanism 905 of Fig. 9. Referring momentarily to Fig. 2 the vertical dividing line noted to the left of amplifier 201 separates the left side from the right side of this figure. This kind of dividing line drawn horizontally similarly separates the upper and lower parts of Figs. 8, 14, 15, 16 and 17. The interconnecting paths shown on Fig. 19 are numbered to correspond with the numbers appearing on Figs. 1 through 17 and the first digits of these numbers directly indicate the figures from which they come. For example, paths 930 and 935 at the bottom of Fig. 19 originate in Fig. 9 while conducting path 1100 originates in Fig. 11. Several of the amplifiers in Fig. 4, such as the vertical file amplifier 414, reset amplifier 419 and the horizontal group amplifiers 422 to 431 are omitted from the circuit paths between the blocks as they are unnecessary to an understanding of the general organization and functional relationships between the principal parts of the invention. Similarly, the output of OR gate 715 in Fig. 7 is shown directly to lead 717, thus omitting the showing of AND gates 714 and 716 and the flip-flop block 701.

Connected to block 1 labeled, "Identifier," are the trunk selector leads TS0–TS5, trunks 00–99, horizontal group leads HGT0–HGT9, vertical file pulse lead PD2 and reset pulse lead RS. These leads come from the concentrator and from the MDF as indicated in Figs. 1 and 2. The horizontal group, vertical file and reset leads are also multipled to block 2 labeled, "Subsequent Attempt Identification and Comparison Circuits." The horizontal group leads 440 are still further multipled through OR gate 715 and conductor 717 to block 3 labeled "Control and Program Circuits."

The Identifier circuitry performs several functions. Its first function is to determine which concentrator is originating the call on which a service observation is to be made. Secondly, it identifies the particular subscriber number in the concentrator. Its third function is to identify the trunk used from the remote concentrator unit to the central office. After this latter identification has been made, it selects the particular trunk of the one hundred trunks connected to the Identifier circuit and connects it to the Data Detector in block 4 via amplifier 201.

Simultaneously with the operation of the Identifier circuitry, these signals from the concentrator have activated the Control and Program Circuits to start the Data Recorder into operation to observe the call. The Control and Program Circuits consist of a series of logic circuits sequentially opening and closing and are driven by a basic timing circuit included in block 3.

The Data Detector circuits when connected to the Identifier first detect dialing, interdigital time, total time for dialing, whether ringing or busy-back is furnished to the subscriber, whether subscriber completes dialing or hangs up, when the called subscriber answers, when speech begins, etc. The action of this detector opens various diode logic paths under control of pulses coming over conductor 803 from the timer in the Control and Program Circuits and the information detected is transmitted to the Data Encoder in block 5. Here the information is encoded in binary form and stored until the Control and Program Circuits indicate that the information should be recorded on the 4-track tape. At this time the information is transmitted from the Data Encoder 5 to the Data Recorder circuitry in block 6.

The Data Recorder circuitry consists of a magnetic tape transport and four magnetic recording heads and their associated amplifiers. The tape transport comprises the tape mechanism 905 driven from the Control and Program Circuits through the tape drive amplifier 907. The process of recording the magnetic marks on the tapes is well understood and has been used many times in computer design.

The Subsequent Attempt Identification and Comparison Circuits in block 2 are used only when a questionable call is observed. By definition, a questionable call is one where the calling subscriber either hangs up prior to completion of dialing, disconnects in less than a preselected time from the start of conversation, receives busy-back, or otherwise gives evidence that it is not a normal call.

In the event of a questionable call indication being received by the Control and Program Circuits, these circuits enable the Subsequent Attempt Identification and Comparison Circuits via conductor 1100 so that the Data Recorder will remain inoperative for an arbitrary period of time unless the orignal calling subscriber again originates a call. In this illustrative embodiment of the invention, this period of time is set at sixty seconds. The subsequent attempt is identified by this equipment by comparing the concentrator and subscriber numbers of every subsequent originating call with the corresponding numbers of the original call. When a complete match of all digits of both concentrator and subscriber number is obtained, an indication is forwarded to the Control and Program Circuits that the subscriber has originated a subsequent attempt in the time interval allowed.

Now turning more particularly to the drawing, it will be noted again that it consists of seventeen figures of schematic diagrams which are interrelated according to the arrangement set forth in Fig. 18. Although the particular embodiment portrayed therein is adapted to operate in cooperative association with line concentrator equipment of the type described in Patent No. 2,812,385, granted to A. E. Joel, Jr., M. E. Krom, and M. Posin on November 5, 1957, it will become apparent as the description proceeds that the apparatus could be adapted to operate with other circuits such as those of the well-known No. 5 cross-bar type. Thus, although the herein-described apparatus is adapted to be actuated in part by timing and control pulses produced by the line concentrators, the apparatus could be arranged to observe service in a crossbar office by adding line scanning apparatus thereto. Such apparatus would then provide pulses corresponding to those emitted by the line concentrators.

Figure 4:
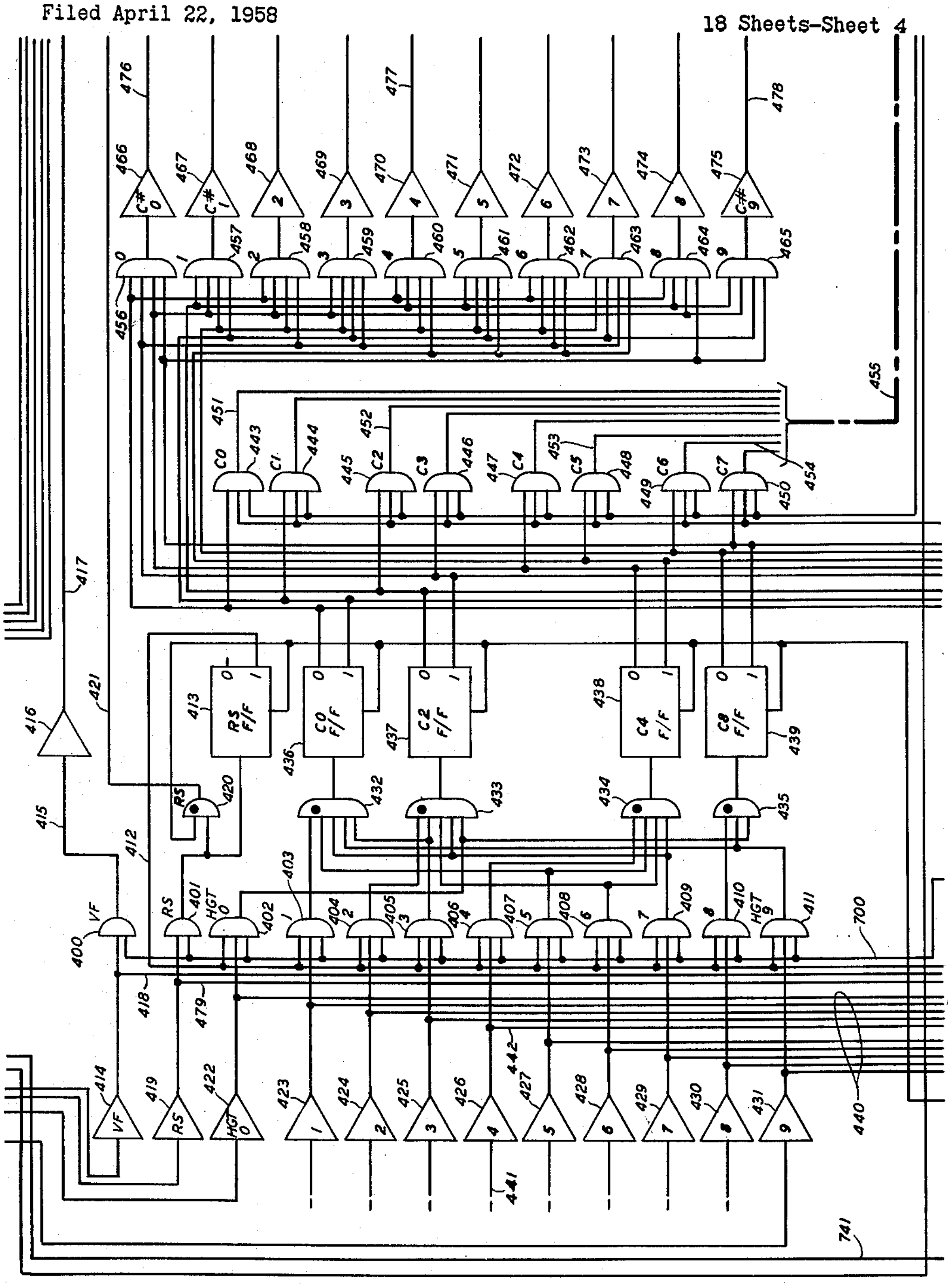

Flip-flops, flip-flop counters, pulse inverters, amplifiers, AND circuits, OR circuits, and INHIBITOR circuits are all well known in the art. Accordingly, although they are widely used throughout the hereinafter-described circuits, it is not deemed necessary to describe the internal elements thereof. Instead, they are shown as "boxes" of rectangular or other configuration. For example, in Fig. 9, a flip-flop is shown as item 900, an amplifier as item 907, and AND, OR, and INHIBITOR circuits as items 910, 902 and 931, respectively. In Fig. 4, a flip-flop counter is shown as item 436.

Certain of the flip-flops are set or reset by negative-going pulses only, thereby permitting resetting thereof by negative pulses derived from the trailing edges of positive pulses. Where such takes place, it will be apparent from the discussion relating thereto.

The flip-flops hereinafter described may preferably be of a transistor type wherein, when the flip-flop is ON (that is, in the 1 state), the potential on the lower output lead, i.e., the 1 lead, is relatively high; whereas when the flip-flop is OFF (that is, in the 0 state), the potential on the upper output lead, i.e., the 0 lead, is relatively high.

As mentioned before, customers' lines terminating in the line concentrators are normally scanned in a repetitive manner according to a numerical sequence from 00 through 49. When a customer lifts his telephone set from the cradle, scanning continues, and when it reaches the calling customer's line, apparatus within the concentrator is actuated to extend a connection from the calling line to one of the outgoing trunks. In addition, an activating potential is transmitted from the concentrator control to one of the ten HGT0–9 amplifiers 422–431, the particular one being that which corresponds to the particular one of the ten concentrators in which the calling customer's line terminates.

When the observing apparatus is reset after a complete observation, VF and RS AND circuits 400 and 401 are enabled by potential conducted to the lower input terminals thereof over lead 700 from the 0 terminal of Off-Normal flip-flop 701. The ten HGT AND circuits 402–411 are disabled, however, by the absence of enabling potential on conductor 412 which connects the 1 terminal of Reset flip-flop 413 to the upper terminal of each of the AND circuits 402–411. In addition, the input AND circuits 702–714 are disabled, 702–713 being disabled by the absence of enabling potential on conductor 1100 leading from the 1 output terminal of Make-Second-Observation flip-flop 1101, and 714 being disabled by the lack of enabling potential on conductor 412.

As mentioned before, each time scanning advances one line, a VF (Vertical File) pulse is generated and is conducted from the concentrator control over lead 100 to VF amplifier 414 and thence to the upper input terminal of the VF AND circuit 400. Since the lower input terminal thereof is enabled, a corresponding pulse is emitted and passes over conductor 415 to amplifier 416 and thence over conductor 417 to the input terminal of the Units Digits Counter 600. The VF pulse is also conducted over lead 418 to the upper terminal of VFS AND circuit 702. However, it cannot activate AND circuit 702 because the lower input terminal thereof is disabled as mentioned before.

Flip-flops 600, 601, 602, and 603 are connected to form a binary counter which is reset on the tenth count. After the counters have been reset, the first pulse received over conductor 417 switches counter 600 on, i.e., to its 1 state, and the next pulse switches it back off again.

Counters 601–603 are arranged to respond only to pulses of negative polarity and each includes in its input circuit a conventional differentiator (not shown) to derive a negative activating pulse from the abrupt decrease in voltage that occurs on the 1 lead of the preceding counter when it is switched off. Therefore, when counter 600 is switched off and the voltage on its 1 lead drops, this drop in potential is conveyed over conductor 604 to the input terminal of counter 601 and is differentiated. The resulting negative pulse switches counter 601 on.

When the third pulse arrives, counter 600 is switched on again, and when the fourth pulse arrives it is again switched off. The drop in potential on the 1 lead of counter 600 is effective to switch counter 601 off, and the drop in potential on the 1 lead of counter 601 is effective to switch counter 602 on. Counting thus continues until the eighth pulse is received, at which time counter 603 is switched on. When the ninth pulse is received, counter 600 is switched on, and when the tenth pulse is received it is again switched off, thereby switching counter 601 on. Counters 601 and 603 are now on and, therefore, relatively high potentials are conducted over leads 605 and 606 to the input terminals of the Tens Digits AND circuit 500.

Since both input terminals of AND circuit 500 are activated, a relatively high potential appears on the output terminal thereof and triggers the Tens Digit Counter 501 from its 0 to its 1 state. At the same time, this relatively high potential is conducted through the ZS OR circuit 504 and thence over conductor 505 to the reset terminals of the Units Digits Counters 600–603, thereby resetting them.

The pulse counting continues in this fashion with the Tens Digits AND circuit 500 being activated each time the Units Digits Counters reach 10. Thus, for example, in response to the receipt of the twentieth pulse, Tens Digits Counter 501 is triggered back to its 0 state and the Tens Digits Counter 502 is switched on. In response to the thirtieth pulse, counter 501 is again switched on; and at the fortieth pulse counter 501 is switched off, counter 502 is switched off and counter 503 is switched on.

The fiftieth pulse in each scanning cycle is emitted when scanning progresses from line 49 to line 00. Accordingly, the fiftieth pulse is utilized to reset the counters. Flip-flop PD2 (Fig. 1) is prevented from emitting a "fiftieth" pulse and, instead, a reset pulse is emitted by the concentrator circuits. This reset pulse is passed through the RS amplifier (Fig. 1) to lead 101 and thence through amplifier 419 to the upper input terminal of RS AND circuit 401. Since the lower input terminal thereof is activated by enabling potential conducted thereto over lead 700, a corresponding pulse is emitted and is conducted to the input terminal of RS flip-flop 413 thereby switching it on. In addition, it is conducted through RS OR circuit 420 and conductor 421 to the reset terminals of Tens Digits Counters 501–503, and over still another path through the ZS OR circuit 504 and conductor 505 to the reset terminals of Units Digits Counters 600–603. Therefore, all the Units and Tens Digits Counters that are not already in the 0 state are set to the 0 state by the reset pulse. Cyclic counting of the VF (Vertical File) pulses thus continues so long as the VF and RS AND gates 400 and 401 are enabled.

In order that a customer's line may be accurately identified, it is necessary that the VF pulse counters (i.e., the Units and Tens Digits Counters) be synchronized with the line concentrator control circuits. Since, after an observation has been completed, the observing apparatus is immediately reset and VF AND gate 400 is re-enabled, it will be apparent that until a reset pulse is received from the concentrator control circuits, the counters may be out of step with the concentrators and that it would be undesirable to base an observation upon information contained therein. Accordingly, reset flip-flop 413 is provided to prevent the initiation of observation until after the counters have been brought into synchronism by a reset pulse received from the concentrator control circuits at the end of the current scan. This is accomplished by connecting an input terminal of each of the AND circuits 402–411 and 714 to the 1 lead of Reset flip-flop 413.

When the rest pulse is received, it switches flip-flop 413 to its 1 state. HGT AND circuits 401–411 and Start AND circuit 714 are unblocked by potential conducted to their upper input terminals from the 1 terminal of flip-flop 413 over conductor 412. Thus, when a subsequent request for service by a customer results in the operation of one of the HWT0–9 flip-flops (schematically represented within the line concentrator control circuit section of Fig. 1), the higher potential on the 1 lead thereof will be conducted over the appropriate one of the obvious paths through the HGT amplifiers 422–431 to an input terminal of the corresponding one of the HGT AND circuits 402–411. Since the remaining input terminals of the AND circuits 402–411 are energized, a corresponding potential is extended from the activated AND circuit to one or more of OR circuits 432–435 and thence to one or more of the counters 436–439. Although potential will also be conducted over the appropriate one of the ten conductors within cable 440 to the center terminals of HGTS AND circuits 704–713, it will be blocked thereat because circuits 704–713 are disabled as hereinbefore mentioned.

OR circuits 432–435, together with their input circuitry, act as translators to translate digits from decimal to binary code, and the binary registers 436–439 store the translated digits. Thus, for example, in activating potential when passed from AND circuit 402 sets registers 437 and 439 to their 1 states, when passed from AND circuit 403 it sets register 436 to its 1 state, when passed from AND circuit 404 it sets register 437 to its 1 state, when passed from AND circuit 405 it sets registers 436 and 437 to their 1 states . . . and when passed from AND circuit 411 it sets registers 436 and 439 to their 1 states.

Since the count registered in the Units and Tens Digits Counters 600–603 and 501–503 represents the number of the line being scanned in each concentrator, and since when a service-requesting line is scanned a "concentrator number" potential (i.e., HGT potential) is received through the particular HGT amplifier that represents the concentrator in which that line is terminated, the count registered in flip-flops 436–439, 600–603, and 501–503 completely identifies the first service-requesting line reached in the initial scanning cycle made subsequent to synchronization of the counters after the end of the previous observation.

In order that the registered count may be prevented from being unintentionally changed, the "concentrator number" potential is conducted over the appropriate one of the leads within cable 440 through start OR circuit 715 to the lower input terminal of start AND circuit 714. Since the upper input terminal is energized over conductor 412, an operating potential is extended to the input terminal of Off-Normal flip-flop 701, thereby switching it to its 1 state. Enabling potential is thereby removed from conductor 700, and all the AND circuits 400–411 are prevented from passing subsequently received pulses until the end of a complete observation cycle.

In order that the operation of the service observing apparatus may be more readily understood, it may be assumed, for example, that after the apparatus has been reset and synchronized, the first service-requesting line to which scanning progresses is line No. 33 in concentrator No. 4. Accordingly, when scanning reaches position 33, an activating potential is received over conductor 441, is amplified by HGT amplifier 426, and is then conducted over two paths: the first is to the center input terminal of AND circuit 406, and the second is via conductor 442 through start OR circuit 715 to the lower input terminal of AND circuit 714. AND circuits 406 and 714 are activated and emit corresponding potentials. That emitted by circuit 406 is passed through OR circuit 434 to set register 438 to its 1 state; whereas that emitted by circuit 714 passes directly to the input terminal of Off-Normal flip-flop 701, thereby switching it on and disabling AND circuits 400–411 as heretofore described.

The identity of the line concentrator in which the request originated, that is, concentrator No. 4, is thus recorded in the form of a 0-state condition of flip-flops 436, 437, and 439 together with a 1-state condition of flip-flop 438; and the twelve AND circuits 400–411 are disabled, thereby preventing subsequent passage therethrough of pulses which would change the digits registered in counters 600–603, 501–503, and registers 436–439.

As mentioned before, when the service observing circuits are reset after having completed a previous observation, all of the various flip-flops therein are set to their 0 states. Therefore, Same-Subscriber flip-flop 900 and Make-Second-Observation flip-flop 1101 are in their 0 states, and neither of the two input terminals to OR circuit 1134 is activated. Accordingly, no inhibiting potential is conducted over lead 1135 to the inhibiting terminal of INHIBITOR circuit 716; and therefore when the Off-Normal flip-flop 701 is triggered to its 1 state, a relatively high potential is passed from INHIBITOR circuit 716 over conductor 717, through the Delay OR circuit 902 and thence to input terminals of the Delay Multivibrator 903 and the Time Drive flip-flop 904.

Delay multivibrator 903 interposes a time delay sufficient to allow the magnetic recording tape Drive Mechanism 905 to come up to speed before Timing Pulse generator 906 is activated. This Delay Multivibrator 903 is of the "one shot" type in which, after being activated, a predetermined time interval passes before the device switches from one of its two states to the other. After being thus switched, it immediately resets itself and remains inactive until it is subsequently reactivated. A conventional differentiator may be included in the input circuits of the Delay Multivibrator 903 in order to derive a pulse from the change in potential at the input terminal coincident with switching of the Off-Normal flip-flop 701.

During the interval in which the Delay Multivibrator is timing out, Time Drive flip-flop 904 is switched to its 1 condition, thereby activating Time Drive amplifier 907 and Tape Drive Mechanism 905. After the tape mechanism has come up to speed, the Delay Multivibrator switches, and the resulting output pulse switches Delay flip-flop 908 to its 1 state. In response thereto, the Timing Pulse multivibrator 906 is activated and emits uniform time-spaced pulses until Delay flip-flop 908 is reset at the end of either a complete or partial observation cycle.

Now briefly summarizing the operation of the circuits thus far, it will be recalled that a resetting pulse was received to bring the units and tens counters into synchronism with the line scanning apparatus (i.e., the concentrator control circuits). The input gates (AND circuits 402–411) were then enabled. Thereafter, when scanning progressed to a service-requesting line, an activating potential was emitted by the concentrator control circuits and was conducted therefrom through the appropriately numbered one of the input amplifiers 422–431 to gating and counting circuits which registered the number of the concentrator in which the request originated. At the same time, the customer's line number was represented by the number of VF pulses registered in counters 600–603 and 501–503. AND circuits 400–411 were then disabled to prevent disturbance of the registered line identification information.

The tape mechanism was then actuated and, after a sufficient delay to allow the driving mechanism to attain desired speed, a timing pulse generator was activated to emit uniform time-spaced pulses until an observing cycle had been completed.

*Recording of customer's line identification information*

When the first of the timing pulses is emitted, it is conducted over lead 909 to the lower input terminal of AND circuit 800. Since, as previously explained, all of the flip-flops are reset at the end of a complete observation cycle, the Second Attempt flip-flop 801 is in its 0 state and the upper input terminal to AND circuit 800 is activated. Accordingly, a pulse is passed from AND circuit 800 through amplifier 802 whence it further travels over several paths. One of these paths extends over conductors 803, 804 and 506 to the lower input terminal of each of the AND circuits 443–450. Another of these paths leads to the input terminal of the Subscriber Number Tens flip-flop 805. The input circuits of flip-flop 805 include a differentiator, and the flip-flop itself is arranged to respond only to negative pulses. Therefore, the leading edge of the timing pulse (which when differentiated produces a positive pulse) does not affect flip-flop 805, and the relatively high voltage which is conducted from the 0 terminal thereof via conductor 806 to the center input terminals of AND circuits 443–450 persists until the timing pulse terminates. Accordingly, four of the eight AND circuits 443–450 are enabled to respond to the timing pulse, the particular four being dependent upon the several states of register flip-flops 436–439.

According to the example selected for this description it was assumed that the calling customer's line is No. 33 in line concentrator No. 4. Therefore, counter 438 is in its 1 state, whereas counters 436, 437, and 439 remain in their 0 states; and, of the eight AND circuits 443–450, only AND circuits 443, 445, 448, and 449 are responsive to the timing pulse. A pulse corresponding to the timing pulse is emitted by each of these four activated AND circuits, and these four pulses are severally passed over conductors 451–454 in cable 455 through OR circuits 1707, 1705, 1702, and 1701 and amplifiers 1715, 1713, 1710 and 1709 to recording heads 1719–1716.

The circuits herein described contemplate the utilization of recording tape suitable for the simultaneous recording of information in four tracks thereon. Accordingly, four heads are provided and each may be activated to record either a mark of positive or negative polarity. Therefore, in the example heretofore described, the first recording head 1716 is pulsed to record a negative mark, the second head 1717 to record a positive mark, the third head 1718 to record a negative mark, and the fourth head 1719 to record a negative mark.

In addition to selectively enabling four of the AND circuits 443–450, register flip-flops 436–439 enable one of the ten translating AND circuits 456–465. According to the selected example, AND circuit 460 is activated by potentials conducted to the four input terminals thereof over the obvious paths severally leading from flip-flops 436–439. The uppermost input terminal of AND circuit 460 is activated by the potential conducted thereto from the 0 lead of flip-flop 436, the next to the uppermost by potential from the 0 lead of flip-flop 437, the next to the lowest by potential from the 0 lead of flip-flop 439 and the lowest by potential from the 1 lead of flip-flop 438.

Accordingly, a relatively high potential is emitted by AND circuit 460, is amplified by amplifier 470, and thence is conducted over lead 477 to selected input terminals of certain of the AND circuits 00–99 in Fig. 2. The part played by this potential will be explained below in connection with the description of trunk cut-through.

*Recording of tens digit*

The concentrator number has been recorded on the tape in response to receipt of the first timing pulse and, as mentioned before, the trailing edge of the first timing pulse is differentiated within the input circuits of the Subscriber-Number-Tens flip-flop 805, thus setting it to its 1 state and activating the upper input terminal of Subscriber-Number-Tens AND circuit 807. When the next timing pulse is generated, it will pass from amplifier 802 via conductors 803 and 804 to the lower input terminal of AND circuit 807, thereby activating it to emit a corresponding pulse which is conducted over the obvious path to the input terminal of Subscriber-Number Units flip-flop 808. However, the input circuit of this flip-flop also contains a differentiator which derives a negative actuating pulse at the end of the timing pulse. It therefore is not switched until the pulse terminates. Accordingly, during the period of the pulse, flip-flop 808 remains in its 0 state and a relatively high potential is conducted therefrom over lead 809 to the lowest input terminal of each of the Tens-Digits AND circuits 507–512.

Since flip-flop 805 is in its 1 state, a relatively high potential is conducted therefrom over lead 810 to the next-to-the-lowest input terminal of each of the AND circuits 507–512; and actuating potentials are conducted to the uppermost input terminals of three of the AND circuits 507–512 over obvious paths leading from the output terminals of Tens Digits Counters 501–503, the particular three being dependent upon the states of the counters. Therefore, when the next timing pulse is generated and conducted from amplifier 802 over leads 803, 804, 506 and 513 to the next-to-the-uppermost input terminal of each of AND circuits 507–512, it effectively actuates only three thereof, the three being those whose uppermost input terminals are activated by counters 501–503. A pulse is emitted by each of the three actuated AND circuits, and these three pulses are severally passed over leads in cable 514 to the aforementioned OR circuits, amplifiers, and recording heads in Fig. 17.

According to the example selected for description, the tens digit is 3, and therefore counter 501 is in its 1 condition, counter 502 is in its 1 condition, and counter 503 is in its 0 condition. Accordingly, the timing pulse is effective to actuate AND circuits 508, 510, and 511 thereby causing them each to emit a corresponding pulse. These three pulses are severally conducted over leads 515–517 in cable 514 and thence through OR circuits 1704, 1702, and 1701 and amplifiers 1712, 1710, and 1709 to recording heads 1718, 1717 and 1716.

In addition to selectively enabling three of the AND circuits 507–512, counters 501–503 enable one of the five translating AND circuits 518–522. Accordingly to the selected example, AND circuit 521 is activated by potentials conducted to the three input terminals thereof over the obvious paths leading from counters 501–503. The upper input terminal of AND circuit 521 is activated by the potential conducted thereto from the 1 lead of counter 501, the center terminal by potential from the 1 lead of counter 502, and the lower terminal by potential from the 0 lead of counter 503.

Accordingly, a relatively high potential is emitted by AND circuit 521, is amplified by amplifier 526, and thence is conducted over lead 528 to input terminals of certain of the AND circuits 000–299 in Fig. 1. The part played by this potential will be explained below in connection with the description of trunk cut-through.

*Recording of the units digit*

As mentioned before, the trailing edge of the second timing pulse, after being differentiated, switches flip-flop 808 to its 1 state. An activating potential is therefore conducted from the 1 terminal of flip-flop 808 to the upper input terminal of Subscriber-Units AND circuit 811 thereby preparing it to emit a pulse when the third timing pulse is received at the lower input terminal thereof from amplifier 802 via conductors 803 and 812. This emitted pulse is conducted over the obvious path to the input terminal of the Final Digit flip-flop 813. However, flip-flop 813 also contains an input differentiating circuit which is effective to derive an activating pulse from the trailing edge of the timing pulse, and the flip-flop therefore does not change its state until the third timing pulse is terminated. Acorrdingly, the lowest two of the input terminals of each of the AND circuits 607–614 are activated respectively by the relatively high potential conducted thereto from the 0 lead of flip-flop 813 and the 1 lead of flip-flop 808 over conductors 814 and 815. The uppermost input terminals of AND circuits 607–614 are selectively connected to the output terminals of counters 600–603. Accordingly, when the third timing pulse is received at the next to the uppermost terminals of AND circuits 607–614 from amplifier 802 via conductors 803, 804, and 506, the particular ones of the AND circuits which respond thereto depend upon the states of the several flip-flops 600–603.

It will now be recalled that the units digit of the subscriber's line number is represented by the combination of states of flip-flops 600–603. According to the selected example, this digit is 3. Therefore, counters 600 and 601 are in their 1 states, and counters 602 and 603 are in their 0 states. Thus, when the third timing pulse is received from amplifier 802 over conductors 803, 804 and 506, AND circuits 608, 610, 611 and 613 each emit a corresponding pulse. These pulses are conducted over leads 615–618 in cable 619 through OR circuits 1706, 1704, 1703 and 1701 and amplifiers 1714, 1712, 1711, and 1709 to recording heads 1719–1716.

In addition to preparing four of the units digits recording AND circuits 607–614 for activation by the timing pulse, counters 601–604 enable one of the ten translating AND circuits 620–629. According to the selected example, AND circuit 623 is activated by potentials conducted to the four input terminals thereof over the obvious paths severally leading from counters 600–603. The uppermost input terminal of AND circuit 623 is activated by the potential conducted thereto from the 1 lead of counter 600, the next to the uppermost by potential from the 1 lead of counter 601, the next to the lowest by potential from the 0 lead of counter 602, and the lowest by potential from the 0 lead of counter 603.

Accordingly, a relatively high potential is emitted by AND circuit 623, is amplified by amplifier 633, and thence is conducted over lead 640 to input terminals of certain of the AND circuits 000–299 in Fig. 1. The part played by this potential will be explained below in connection with the description of trunk cut-through.

At the end of the third timing pulse, flip-flop 813 is switched to its 1 state thereby preparing hereinafter-described circuits for the recording of timing pulses and representations of other phenomena.

*Recording of timing pulses*

When flip-flop 813 is switched to its 1 state, a relatively high potential is conducted from its 1 terminal over conductor 816 to an input terminal of Timing Pulse AND circuit 910. Since all of the remaining input terminals (except the terminal connected to the timing pulse lead 803) are activated, the next timing pulse is effective to activate AND circuit 910 thereby causing it to emit a corresponding pulse which is conducted over lead 911 through OR circuit 1701 and amplifier 1709 to recording head 1716. Timing pulses are thus effectively recorded until either the subscriber hangs up or dial tone is furnished.

*Trunk cut-through*

Out at the line concentrator equipment, other operations have been taking place while the subscriber's line identification digits are being recorded. When the subscriber first lifted his instrument from the cradle, his line relay operated and this in turn resulted in the activation of circuits which in time interconnect the subscriber's line with a trunk leading to the central office. When such connection is made, one of the pairs of normally open contacts TS0–TS5 close, thereby raising the potential at the upper input terminal of the corresponding one of INHIBITOR circuits 116–121. Since Make-Second-Observation flip-flop 1101 and Preference flip-flops 102–107 are all in the 0 state, conductor 741 and the remaining six input leads to OR circuit 122 are all de-energized. Accordingly, inhibiting lead 123 is de-energized, and INHIBITOR circuits 116–121 are effective to respond to the aforementioned rise in potential by passing a corresponding potential which switches the related one of flip-flops 102–107 to the 1 state.

The TS0–TS5 contacts are auxiliary to preference relays which are included in the line concentrator equipment and which, when operated, serve to control connection of a customer's line to a particular one of the six trunks to which the customer's line has access. Since, in point of time, the calling customer's line is ordinarily not connected to a trunk until after his line identification digits are recorded (as hereinbefore described) some few of the aforementioned timing pulses will be recorded ordinarily before the Preference flip-flop is switched.

INHIBITOR circuits 116–121 and associated circuits are included to prevent switching of others of flip-flops 102–107 while observation is taking place. As soon as one of the flip-flops 102–107 has been switched to the 1 state, an activating potential is conducted from the 1 terminal thereof over one of the obvious paths through OR circuit 122 and thence over conductor 123 to the inhibiting terminals of INHIBITOR circuits 116–121. The INHIBITOR circuits are thus disabled and will prevent switching of any others of flip-flops 102–107 until the concentrator circuits are either completely or partly reset.

Other items of information to be recorded are taken from the trunk to which the calling line is connected, and since each line has access to six trunks, it is necessary to know which trunk has been connected to the line in order that the observing apparatus may also be connected thereto. Circuits for identifying the selected trunk and for connecting the observing apparatus include the translating matrices 456–465, 518–522, and 620–629, the Preference flip-flops 102–107, the 300 Line-and-Preference AND circuits 000–299 of Fig. 1, the Trunk-Grouping OR circuits 0–9 (Fig. 1), and the 100 Trunk-Gating AND circuits 00–99 of Fig. 2.

When scanning is taking place before a request-for-service signal is received, the states of counters 600–603 and 501–503 are constantly changing. However, when the counters are locked as heretofore described, they no longer change and the information contained therein is advantageously employed to identify the trunk to which connection is made.

Referring again to Fig. 4, it will be noted that, as described above, output terminals of counters 436–439 are connected not only to the recording AND circuits 443–450 but in addition are variously connected to input terminals of binary-to-decimal-code translating AND circuits 456–465. Similarly, in Figs. 5 and 6, output terminals of counters 501–503 and 600–603 are connected respectively to input terminals of binary-to-decimal-code translating AND circuits 518–522 and 600–629. Leads from these translating AND circuits severally pass through amplifiers 466–475, 523–527, and 630–639 to the trunk-identifying circuits in Figs. 1 and 2.

As is mentioned above, each concentrator is connected to ten trunks, concentrator 0 being connected to trunks 0–9, concentrator 1 to trunks 10–19, concentrator 2 to trunks 20–29, . . . and concentrator 9 to trunks 90–99. For purposes of this description, it may be assumed that within the concentrators, the trunk access and preference circuits are duplicates. Thus, for example, if line 03 in concentrator 0 has access to trunks 02, 05, 01, 07, 00, and 09 in that order of preference, line 03 in concentrator 1 has access to trunks 12, 15, 11, 17, 10, and 19 in that order . . . and line 03 in concentrator 9 has access to trunks 92, 95, 91, 97, 90, and 99 in that order.

The trunk-identifying circuits are adapted to advantageously exploit this uniformity. By connecting certain of the circuits in multiple, as hereinafter more fully described, only 300 line-and-preference AND circuits 000–299 are required instead of the 3000 that would be needed otherwise.

Although in commercial embodiments it may be advantageous in each concentrator to provide access from all fifty lines to two of the trunks and to distribute the remaining eight trunks in varying orders of preference among the lines, the circuits have here been shown to provide equal access to each of the trunks in order to render the description more readily understandable.

The trunks to which the lines have access depend upon the cross connections made in the concentrators, and once these are established, the connections from the afore-mentioned amplifiers to the trunk-identifying circuits can be made in accordance with the principles set forth below.

Now turning more particularly to the trunk-identifying circuits, it may be seen that they include 100 Trunk-Gating AND circuits 00–99 (Fig. 2). The 100 trunks are severally connected to input terminals of these AND circuits, trunk 00 being connected to AND circuit 00, . . . and trunk 99 being connected to AND circuit 99. These AND circuits are individually activated to effectively connect the observing apparatus to the trunk over which the observed call is taking place.

The remaining two input terminals of the Trunk-Gating AND circuits 00–99 are selectively connected to the Trunk-Grouping OR circuits 0–9 and the Concentrator-Number Amplifiers 466–475. Thus, the center input terminals of Trunk-Gating AND circuits 00, 10, 20, . . . and 90 are connected to the output terminal of Trunk-Grouping OR circuit 0; the center input terminals of Trunk-Gating AND circuits 01, 11, 21 . . . and 91 are connected to the output terminal of Trunk-Grouping OR circuit 1; . . . and the center input terminals of Trunk-Gating AND circuits 09, 19, 29, . . . and 99 are connected to the output terminal of Trunk-Grouping OR circuit 9. Accordingly, each of the OR circuits 0–9 is specifically related to ten trunks, one in each concentrator.

The lower input terminals of the Trunk-Gating AND circuits are connected in groups of ten to the ten Concentrator-Number Amplifiers 466–475. Thus, the lower terminals of AND circuits 00–09 are connected to amplifier 466; those of AND circuits 10–19 to amplifier 467; . . . and those of AND circuits 90–99 to amplifier 475.

As is explained above, the ten Trunk-Grouping OR circuits 0–9 are each related to ten trunks, one in each concentrator. Accordingly, were it not for the leads from amplifiers 466–475, activation of any one of the OR circuits 0–9 would result in activation of ten of the AND circuits 00–99. However, the signal produced by one of the amplifiers 466–475 identifies the concentrator to which the desired trunk is connected, thereby distinguishing it from the other nine.

Since the trunks of each concentrator are distinguished from those of the remaining concentrators in AND circuits 00–99, the principles underlying the arrangement of input connections to the Line-and-Preference AND circuits 000–299 (Fig. 1) can perhaps be most readily understood when considered in regard to a single concentrator, say concentrator 0.

As mentioned before, fifty lines and ten trunks are connected to each concentrator. If, as heretofore described, each line has access to six trunks and such access is uniformly distributed among the trunks, thirty lines will be connectable to each trunk. Accordingly, the Line-and-Preference AND circuits 000–299 are connected in ten groups of thirty each to the ten Trunk-Grouping OR circuits 0–9.

Each AND circuit within a group of thirty relates to a combination of line and preference numbers that designate the trunk to which the group appertains. In order to effect this relation, each of the AND circuits 000–299 is provided with three input terminals, the lower two being representative of the units and tens digits of a line, and the upper terminal being representative of the order of preference number that will result in connection of that line to the designated trunk. Thus, for example, AND circuit 000 relates to the connection of line 00 to trunk 00 which will occur if the first preference is exercised. This can be seen by observing the input terminals of AND circuit 000. The upper input terminal is connected to the First-Preference flip-flop 102 through amplifier 109; the center input terminal is connected to the Tens-Digit-0 translating AND circuit 518 through amplifier 523; and the lower input terminal is connected to the Units-Digit-0 translating AND circuit 620 through amplifier 630. Accordingly, when the observed line is line 00 (the first line in the group of lines 00–49), and when the trunk to which it is connected is the first in order of preference, Line-and-Preference AND circuit 000 will be activated. Since, for purposes of illustration it may be assumed that in any one of the ten concentrators this combination of line and preference numbers represents the line connection to the first trunk in the group of ten trunks (trunk 00 in concentrator 0, trunk 10 in concentrator 1, etc.) the output terminal of Line-and-Preference AND circuit 000 is connected to an input terminal of Trunk-Group OR circuit 0.

Now considering the selected example (line 33 in concentrator 4), it will be seen that when the aforementioned potentials are conducted from amplifiers 470, 526, and 633 over conductors 477, 528, and 640 to the trunk-identifying circuits; and when, while these potentials are being thus conducted, Preference flip-flop 102 is triggered to its 1 state, Line-and-Preference AND circuit 198 is activated to emit a relatively high potential. The presence of this relatively high potential at an input terminal of Trunk-Grouping OR circuit 1 indicates that line 33 in one of the ten concentrators has been connected by apparatus (not shown) to one of the ten trunks 01, 11, 21, 31 . . . 91.

The relatively high potential is passed through OR circuit 1 to the center input terminals of Trunk-Gating AND circuits 01, 11, 21, 31, . . . 91. As mentioned before, however, only one of these ten AND circuits will be activated, the particular one being that related to the concentrator in which the calling line is terminated. Since, according to the example selected, this is concentrator 4, Trunk-Gating AND circuit 41 alone is activated, thereby effectively connecting trunk 41 to the Trunk-Isolating OR circuit 200. Further progress of the call is observed over the connection from trunk 41 through OR circuit 200.

The output terminal of OR circuit 200 is connected to amplifier 201 which amplifiers signals received from the trunk before passing them to the input terminals of Dial-Pulse Detector 202, Ringing-Tone Detector 203, Busy-Back Detector 204, Subscriber-Disconnect Detector 205, and Speech Detector 206. Each of these five devices 202–206 is known in the art, and a detailed description of the internal circuits thereof is therefore deemed to be unnecessary.

The Dial-Pulse Detector 202 contains circuits which respond to conventional dial pulses and which are unresponsive to other electrical phenomena. The Ringing-Tone Detector 203 responds only to brusts of ringing-tone frequency and is unaffected by other signals. The Busy-Back Dctector is somewhat similar to the Ringing-Tone Detector but is tuned to respond to signals having Busy-Back frequency only. The Subscriber-Disconnect Detector is responsive only to an electrical disconnect signal, and the Speech Detector responds only to signals having speech frequency components.

*Furnishing of dial tone*

Within a few seconds after the line and trunk are connected by the concentrator circuits (not shown), dial tone is furnished to the calling customer over the trunk and thence over his own line. During the interval intermediate the recording of the last line-identification digit and the furnishing of dial tone, the aforementioned timing pulses are recorded on the magnetic tape. However, when dial tone is furnished, contacts of an HM relay in the line concentrator equipment are closed and a path is extended from ground at contacts of the HM relay and thence over conductor 115 to the input terminal of the Serve flip-flop 817, thereby switching it from its 0 to its 1 state. Since the Final Digit flip-flop 813 is in its 1 state, since the FUR flip-flop 912 is in its 0 state and since the Serve flip-flop 817 is in its 1 state, Serve AND circuit 913 is enabled and the next timing pulse will be passed therethrough to switch the Dial-Tone-Furnished flip-flop 914 to its 1 state. The relatively high potential normally conducted from the 0 terminal of flip-flop 914 over conductors 915 and 916 to TMG AND circuit 910 is thereby removed, thus disabling the TMG AND circuit and preventing the passage therethrough of the next timing pulse. The relatively high potential now appearing at the 1 terminal of flip-flop 914 prepares the Dial-Tone-Furnished AND circuit 917 for response to the next timing pulse. Thus, when the next timing pulse is generated, it passes over the path hereinbefore traced via conductor 803 through to AND circuit 917 and causes AND circuit 917 to emit a corresponding pulse which is passed over conductors 918 and 919 through OR circuit 1703 and amplifier 1711 to recording head 1717.

The pulse is also conducted from lead 918 over conductor 920 to the reset terminal of flip-flop 914 thereby resetting it. The potential at the 0 terminal thereof therefore rapidly rises and this rapidly rising potential is conducted over leads 915 and 921 to the input circuits of flip-flop 912 in which it is differentiated to produce a pulse which switches flip-flop 912 from its 0 to its 1 state. Enabling potential is therefore removed from the uppermost input lead to the Serve AND circuit 913, thereby preventing reactivation of flip-flop 914. In addition, potential is removed from the upper input terminal of Dial-Tone-Furnished AND circuit 917, thereby preventing passage therethrough of subsequently received timing pulses.

*Detection, registration, and recording of dialed digits*

As mentioned before trunk sampling lead 41 (Fig. 2) is effectively connected through Trunk-Gating AND circuit 41 (Fig. 2), OR circuit 200, and amplifier 201 to detecting devices 202–206. When the customer dials the first digit, the first pulse thereof actuates Dial-Pulse Detector 202. A corresponding pulse is emitted therefrom and is conducted over lead 207 to the input terminal of Dial-Pulse flip-flop 300. In addition, it is conducted over leads 207, 208, 1500, and 1400 to the reset terminal of 150-Milliseconds Multivibrator 1000, the input terminal of Interdigital-Pause flip-flop 1001, and the reset terminal 100-Milliseconds Multivibrator 1002. The three devices 1000–1002 perform digit recognition and registration functions which will hereinafter be more fully described.

When the first dial pulse is received, the Dial-Pulse Detector emits a corresponding pulse which sets flip-flop 300 to the 1 state. The relatively high potential theretofore conducted from the 0 terminal via lead 301 to an input terminal of the Subscriber Disconnect AND circuit 922 is therefore removed, and instead, the upper input terminal of Dial-Pulse AND circuit 302 is activated. Since Dialing flip-flop 303 is in its 0 State, Dial Pulse AND circuit 302 is enabled. Therefore, when the next timing pulse is generated, it is effective over lead 506 to cause AND circuit 302 to emit a corresponding pulse which sets Begin Dialing flip-flop 304 to its 1 state. The relatively high potential theretofore conducted over lead 305 to one of the input terminals of Timing AND circuit 910 is removed, thereby disabling circuit 910 and preventing passage therethrough of the next timing pulse. At the same time, the relatively high potential at terminal 1 of flip-flop 304 effectively enables the Begin-Dialing AND circuit 306. Therefore, when the next timing pulse is generated, it is effective over conductors 506 and 307 to cause AND circuit 306 to emit a corresponding pulse which is conducted over leads 308 and 309 to the recording circuits of Fig. 17 where it is recorded as a "Begin Dialing" mark. In addition, the pulse is conducted over leads 308, 310 and 311 to set flip-flop 303 and reset flip-flop 304.

Flip-flop 303, when switched to its 1 state by the a forementioned pulse, serves to disable AND circuit 302, thereby preventing subsequent reactivation of the Begin-Dialing flip-flop 304 during the current observation cycle. In addition, it activates an input terminal of each of AND circuits 1105 and 1121 over conductors 335 and 1143. When flip-flop 304 is reset, Timing AND circuit 910 is again enabled thereby permitting subsequent passage of timing pulses therethrough. Therefore, the recording of timing pulses is resumed and continues until interrupted to permit recording of the next different item of information. As will be presently seen, this normally is the End-Of-Dialing mark.

The Dial-Pulse Detector 202 not only generates a pulse in response to the receipt of the first dialed impulse, but actually "follows" the dialing so that in effect repeats the dialed impulses. Since flip-flop 303 is in its 1 state, these impulses have no further effect on the circuits of Fig. 3. However, the repeated dial pulses are conducted via leads 208, 1500, and 1400 to the input terminal of flip-flop 1001 and the reset terminals of devices 1000, 1002, 1006, and 1007. These devices, together with attending circuitry, serve to process and register the dialed digits.

The 150-Millisecond Multivibrator 1000 and the 100-Millisecond Multivibrator 1002 are of the free running type, that is, of the type that produce brief output pulses on their 1 leads every 150 milliseconds and 100 milliseconds respectively. As mentioned above, the terminals connected to conductor 1400 are reset terminals; and therefore when each dial pulse is received, the multivibrators are reset. So long as dial pulses are received more often than once every 150 milliseconds (once every 100 milliseconds for multivibrator 1002) no output pulse is emitted.

Since at the end of the previous cycle of observation, Stepping Tube 1003 was reset to its 1 terminal, an enabling potential is conducted therefrom via lead 1004 to the lower input terminal of First-Digit-Counter AND circuit 1401. Thus, the repeated dial pulses of the first dialed digit are effective, when passed to the upper input terminal from conductors 1500 and 1402, to cause AND circuit 1401 to emit corresponding pulses which are passed to the First Digit Counter 1403. Counters 1403–1406 are conventional binary counters connected in tandem to count the pulses of the first dialed digit in the well-known manner.

As long as these pulses are being received, the aforementioned 150-Millisecond Multivibrator 1000 is rendered ineffective to produce an output pulse. Therefore, even though the first pulse effectively set flip-flop 1001 to its 1 state, the 150-Millisecond AND circuit 1005 is disabled. However, during the interdigital pause, that is, during the time that elapses between the receipt of the last pulse in a pulse string and the first pulse in the next pulse string, at least two pulses are emitted by multivibrator 1000. These pulses cause AND circuit 1005 to emit corresponding pulses which are impressed on the input terminal of 150-Millisecond Pulse Counter 1006. The first of the pulses sets counter 1006 to its 1 state, and the second one switches it back off again. A negative pulse derived from the fall in potential on the 1 lead of flip-flop 1006 (by the input circuits of flip-flop 1007) triggers Interdigital Time flip-flop 1007 to its 1 state. A relatively high potential is therefore extended over conductor 1008 and thence in two directions: one over conductor 1009 to the upper input terminal of Interdigital-Time AND circuit 1010, and the other over conductor 1011 to the upper input terminal of the Seventh-Digit AND circuit 1012.

Since, as hereinbefore mentioned, Interdigital Pause flip-flop 1001 is in its 1 state, AND circuit 1010 is prepared to respond to the next subsequent pulse emanating from the 100-Millisecond Multivibrator 1002. When this pulse is received by AND circuit 1010, a corresponding pulse is emitted therefrom and is conducted over the obvious path through the Stepping Tube Amplifier 1013 to Stepping Tube 1003 thereby triggering the latter to its No. 2 electrode. Thus, the relatively high potential heretofore conducted over lead 1004 to enable the First-Digit-Counter AND circuit 1401 is removed and a corresponding voltage is conducted via lead 1014 to an input terminal of each of the three AND circuits 1407–1409.

The aforementioned pulse emitted by AND circuit 1010, in addition to being passed through the Stepping Tube Amplifier 1013, is conducted over another path via lead 1015 to the reset terminal of flip-flop 1001. At the end of the pulse, the fall in potential is differentiated and the derived negative pulse resets flip-flop 1001, thus removing enabling potential from the center terminal of AND circuit 1010 and the lower input terminal of AND circuit 1005 and preventing passage therethrough of additional pulses from multivibrators 1000 and 1002.

When the first pulse of the next pulse string is received over conductor 1400, it resets the 150-Millisecond Multivibrator 1000, the 100-Millisecond Multivibrator 1002, the 150-Millisecond flip-flop 1006, and the Interdigital Time flip-flop 1007, thus preparing them and the associated circuits for advancing the Stepping Tube during the next interdigital pause.

If the number dialed contains the usual seven digits, registration thereof continues from counter to counter until all seven digits have been received. During each interdigital pause, the Stepping Tube is progressively advanced one step along the numbered electrodes in the same manner as that hereinbefore described. This results in the progressive gating of the First through the Seventh Digit AND circuits (1401, 1409, 1501, 1502, 1600, 1601, and 1602) which effectively connect the several sets of digit counters to the pulsing lead 1500. Thus, it may be seen that the Third-Digit AND circuit 1501 is enabled when the Stepping Tube is switched to its third electrode by the relatively high potential which is conducted from electrode 3 to the lower terminal of gate 1501 via conductor 1016. The remaining Stepping Tube electrodes 4–7 are selectively connected via conductors 1017–1021 to input terminals of Digit-Counter AND circuits 1502, 1600, 1601, and 1602.

After the last, i.e., the seventh digit is registered, the Interdigital Time flip-flop 1007 is operated during the following pause, thus energizing the upper terminal of the Seventh-Digit AND circuit 1012 over conductors 1008 and 1011. Since the Stepping Tube remains electrically effective at its seventh electrode for a brief subsequent interval, the electrical potential conducted therefrom via leads 1020 and 1022 renders the Seventh-Digit AND circuit 1012 effective to activate the Dialing-Complete OR circuit 1023 and the Dialing-Complete flip-flop 1024 over the obvious paths.

Dialing-Complete flip-flop 1024, when switched, activates the center input terminal of Dialing-Complete AND circuit 1025. Therefore, when the next timing pulse is received over conductors 803, 818, 1102, 1103, 1104, 1029 and 1030, it causes AND circuit 1025 to emit a corresponding pulse which switches End-Of-Dialing-Record flip-flop 1026 from its 0 to its 1 state, thereby removing potential from one of the input terminals of the Timing AND circuit 910 over conductor 1027. At the same time, the drop in potential on the zero lead of flip-flop 1026 is differentiated in the input circuits of the End-Of-Dialing Auxiliary flip-flop 1028 to produce a pulse which switches flip-flop 1028 to its 1 state, thereby disabling the Dialing-Complete AND circuit 1025 and preventing subsequent enablement thereof during the observation cycle.

When the next timing pulse is received from conductor 1030, it causes End-Of-Dialing-Record AND circuit 1031 to emit a corresponding pulse which is effective to: (1) activate recording heads 1716, 1717, and 1719 over conductors 1031, 1032, 1720, and 1721; (2) reset End-Of-Dialing-Record flip-flop 1026 to its 0 state over the obvious path, thereby disabling End-Of-Dialing-Record AND circuit 1031 and preventing subsequent activation thereof by timing pulses; and (3) switch the Record-Dialed-Digits flip-flop 1033 to its 1 state, thereby removing potential from one of the input terminals to the Timing AND circuit 910 over conductor 1034 and preventing activation thereof by the next timing pulse. A relatively high potential is now conducted from flip-flop 1033 via conductors 1035 and 1503 to an input terminal of each of the Digit-Record AND circuits 1410, 1411, 1504, 1505, 1603, 1604, and 1605. The dialed digit information is now sequentially read out of the counters and correspondingly sequentially recorded on the tape by the recording heads in the following manner.

Turning particularly to AND circuit 1410, it will be noted that the upper input terminal thereof is connected via conductor 1412 to the 0 terminal of the End-Of-First-Digit-Recording flip-flop 1413. Since the lower terminal of AND circuit 1410 is energized via conductor 1503 as hereinbefore stated, the next timing pulse which is received from conductor 1103 over conductor 1506 is effective to cause AND circuit 1410 to emit a corresponding pulse which switches the Record-First-Digit flip-flop 1414 to its 1 state. Accordingly, the First-Digit-Record AND circuits 1415–1422 are prepared to selectively respond to the next timing pulse, and the End-Of-First-Digit-Recording AND circuit 1423 is also prepared to emit a pulse when the next timing pulse is received.

When the next timing pulse is received over conductors 1506 and 1424, it passes through only those of the First-Digit AND circuits 1415–1422 which represent the count registered in counters 1403–1406. This will be apparent from an inspection of the input terminals of the AND circuits of which there are three each. One of the three input terminals is commonly connected to conductor 1424. Another of the input terminals is commonly connected to the aforementioned energized 1 lead of flip-flop 1414 over conductors 1425 and 1426, while the remaining input terminals are selectively connected to the output terminals of the associated counters.

Thus, for example, if the first dialed digit is a 3 (or one of the letters D, E, and F), counters 1403 and 1404 will be switched to their 1 states, and counters 1405 and 1406 will remain in their unswitched, i.e., 0 states.

Accordingly, AND circuits 1416, 1418, 1419, and 1421 will respond to the aforementioned next-received timing pulse by emitting corresponding pulses which are severally conducted via leads 1427–1430 in cable 1431 to recording OR circuits 1701, 1703, 1704, and 1706 and recording heads 1716–1719.

As mentioned above, the timing pulse also causes End-Of-First-Digit-Recording AND circuit 1423 to emit a corresponding pulse which is conducted over the obvious path to the input terminal of flip-flop 1413. This flip-flop contains in its input circuits a differentiator which produces a negative pulse coincident with the termination of the timing pulse. This negative pulse is effective to switch flip-flop 1413 to its 1 state, thereby enabling the Record-Second-Digit AND circuit 1411 and preparing it to respond to the next received timing pulse by emitting a corresponding pulse which is passed to the input terminal of the Record-Second-Digit flip-flop 1432. Therefore, when the next timing pulse is received, it is effective to switch flip-flop 1432 from its 0 to its 1 state, thereby preparing End-Of-Second-Digit Recording AND circuit 1433 to respond to the next-received timing pulse. In addition, it prepares the Second-Digit-Record AND circuits 1434–1441 for reading out information from the Second Digit Counters 1442–1445 in the same manner as that heretofore explained with respect to the First Digit AND circuits 1415–1422. Accordingly, when the next timing pulse is received, it causes four of the Second Digit AND circuits 1434–1441 to emit pulses which are conducted over four of the leads in cable 1446 to the recording heads of Fig. 17.

The timing pulse also causes AND circuit 1433 to emit a pulse whose trailing edge, after differentiation in the input circuits of the End-Of-Second-Digit-Recording flip-flop 1447, is effective to switch flip-flop 1447 from its 0 to its 1 state, thus preparing the Record-Third-Digit AND circuit 1504 to respond to the next timing pulse.

The third, fourth, fifth, sixth, and seventh digits are similarly read from the counters and recorded by recording heads 1716–1719. When the seventh digit has been recorded, the End-Of-Seventh-Digit Recording flip-flop 1606 is switched from its 0 to its 1 state. The resulting drop in potential at the 0 terminal thereof is conducted over lead 1607 to the Dial-Pulse-Recording-Complete Amplifier 1608 whence it is conducted over lead 1609 to reset terminals of each of the registration flip-flops 1414, 1413, 1432, 1447, 1507–1510, and 1610–1614. In addition, it is conducted from lead 1609 over conductor 1511 to the reset terminal of the Record-Dialed-Digits flip-flop 1033 thereby resetting it, reactivating the Timing AND circuit 910, and disabling AND circuits 1410, 1411, 1504, 1505, 1603, 1604, and 1605.

The digits dialed by the customer have now been received, registered, and recorded, and a coded mark has been recorded on the tape to indicate the time in the observation cycle at which dialing began. In addition, another coded symbol has been recorded to identify the time at which dialing was completed.

The observation circuits are now prepared to respond to ring-back tone which is received at the Ringing Tone Detector 203 from the trunk via the trunk gating circuits heretofore described. Until ringing tone is received, however, the timing pulses are recorded through the Timing AND circuit 910 in the manner hereinbefore explained.

*Detection of ringing tone and recording of corresponding symbol*

When ringing tone is received, the Ringing-Tone Detector 203 emits a signal through the Ringing-Tone Inverter 209 to the input terminal of the Ringing-Tone flip-flop 210. In addition, it is passed over conductor 211 to the reset terminal of the Four-Second Timer 312. Flip-flop 210 is switched to its 1 state and the relatively high potential at its 1 terminal is conducted over leads 212 and 223 to an input terminal of AND circuit 1105, and over lead 212 to the activating terminal of the Four-Second Timer 312, the upper input terminal of the Called-Party-Answer AND circuit 313 and the upper input terminal of the Ringing-Tone AND circuit 314. Since flip-flop 315 is in its 0 state, Ringing-Tone AND circuit 314 is prepared to respond to the next timing pulse received from conductor 506 by emitting a corresponding pulse which is conducted to the input terminal of the bell-ringing flip-flop 316, thereby switching it to its 1 state. The drop in potential at the 0 terminal of flip-flop 316 is effective over conductor 320 to disable Timing AND circuit 910. It is also effective when differentiated within the input circuits of flip-flop 315 to switch flip-flop 315 to its 1 state, thereby removing enabling potential from the lower input terminal of AND circuit 314 and preventing effective activation thereof by subsequently received timing pulses.

Since the End-Of-Seventh-Digit-Recording flip-flop 1606 is in its 1 state, the relatively high potential conducted therefrom via lead 1615 activates the upper input terminal of Bell-Ringing AND circuit 317; and, since the lower input terminal of AND circuit 317 is activated by the relatively high potential conducted thereto over the obvious path, Bell-Ringing AND circuit 317 is prepared to respond to the next received timing pulse by emitting a corresponding pulse which is conducted over leads 318 and thence over the obvious paths to recording heads 1716 and 1717. In addition, it travels over conductor 319 to the reset terminal of Bell-Ringing flip-flop 316 where the trailing edge is differentiated to produce a resetting pulse.

*Called party answer and recording of corresponding symbol*

Spurts of ringing tone are applied to the line more often than once every four seconds and, therefore, the Four-Second Timer 312 is repetitively reset without having timed out until either the calling customer hangs up or the called party answers. In the meantime, timing pulses are being recorded on the tape in order to provide a means of measuring the time during which ringing tone is applied to the line.

When the called party answers, the Four-Second Timer 312 times out and enables the Called-Party Answer AND circuit 313 to respond to the next received timing pulse. The uppermost input terminal to AND circuit 313 is energized over conductor 212 from activated flip-flop 210; the lowest input terminal is activated from the 0 terminal of the Start-Speech-Observation flip-flop 1200 over conductor 1201; the next to the lowest input terminal is activated when the Four-Second Timer times out; and the next to the uppermost input terminal is that over which the timing pulse is received from conductor 506. Therefore, the next timing pulse causes Called-Party-Answer AND circuit 313 to emit a pulse which switches Called-Party-Answer flip-flop 321 from its 0 to its 1 state. The relatively high potential appearing on the 1 lead thereof activates the lower input terminal of Called-Party-Answer Record AND circuit 322 and in addition is effective over conductor 323 to switch Speech-Detection Auxiliary flip-flop 213 from its 0 to its 1 state, thereby partly enabling Speech-Detection AND circuit 214 at the upper input terminal thereof. Since the next to the lowest input terminal of Called-Party-Answer-Record AND circuit 322 is activated over conductor 1615 from terminal 1 of flip-flop 1606, and since the uppermost terminal is activated over conductor 215 from the 0 terminal of Subscriber-Disconnect flip-flop 216, AND circuit 322 is rendered responsive to the next timing pulse which is received over conductor 307.

An additional function performed when flip-flop 321 switches to its 1 state is the disablement of the Timing AND circuit 910 by the removal of potential from conductor 324. Another is the removal of potential via conductor 324 from the lowermost input terminal of the Don't-Answer AND circuit 1105 thereby preventing activation of Don't-Answer flip-flop 1106 and the recording of an erroneous Don't-Answer signal.

Figure 17:
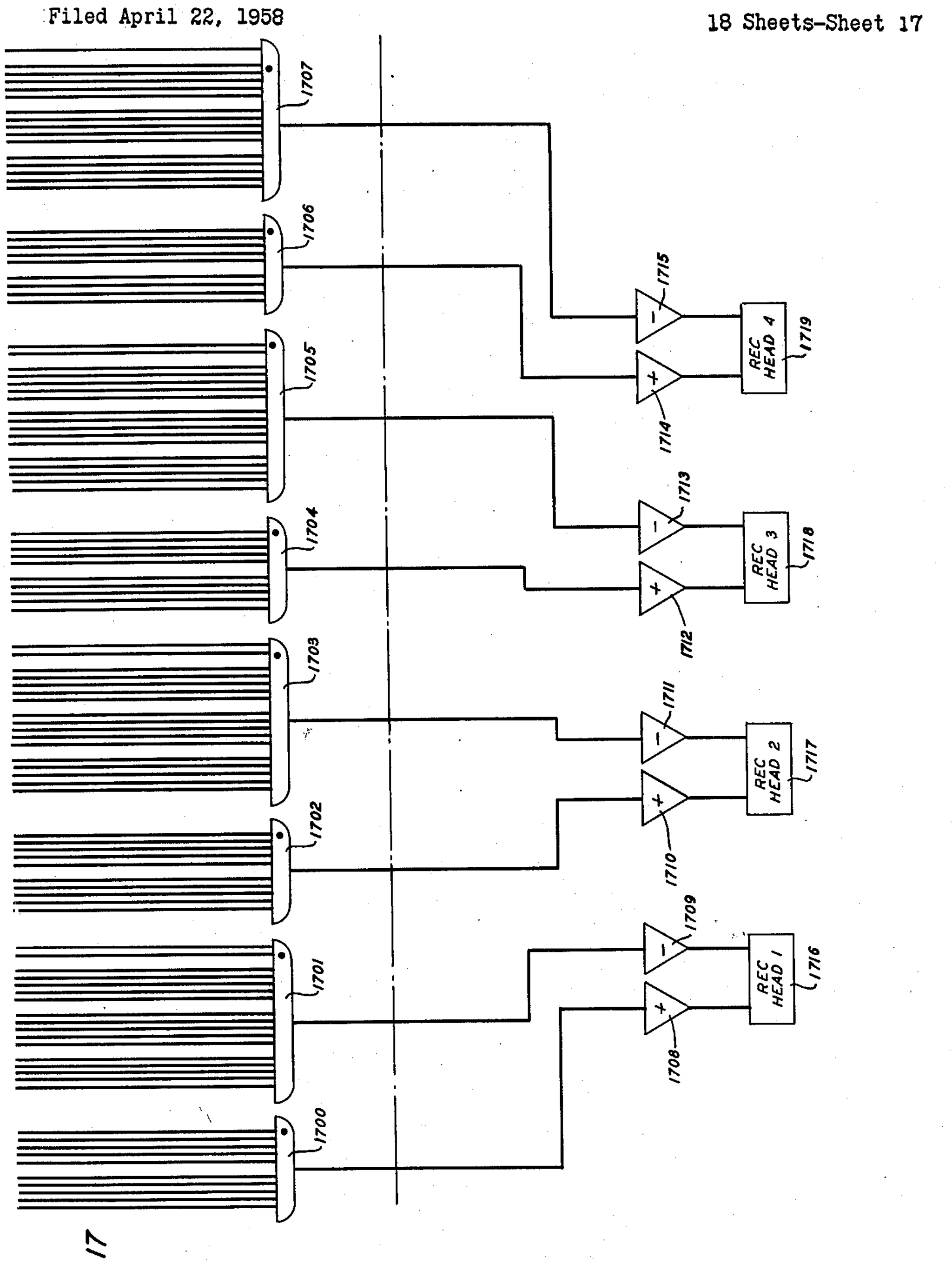

When the next timing pulse is received, AND circuit 322 emits a corresponding pulse which is conducted over the following paths: one is via conductors 325, 1202, and 1203 to the recording circuits of Fig. 17 and the input terminal of Start-Speech Observation flip-flop 1200; and the other is over conductor 326 to the reset terminal of the Called-Party-Answer flip-flop 321. This flip-flop also contains an internal differentiator which produces a negative pulse from the trailing edge of the pulse emitted by AND circuit 322, thereby resetting flip-flop 321 coincident with the timing pulse termination.

The timing AND circuit 910 is again enabled by the restoration of potential thereto over conductor 324 from the 0 terminal of flip-flop 321, and timing pulses are again recorded until either the calling subscriber hangs up or ten seconds transpire subsequent to the recognition of speech on the trunk.

When speech is received, Speech-Detector 206 emits an actuating pulse to Speech-Detector flip-flop 217 thereby setting it to its 1 state and actuating Speech Detector AND circuit 215 over the obvious path. Accordingly, a potential is conducted therefrom over lead 218 to the second uppermost input terminal of the Questionable-Call AND circuit 1204. The potential is also conducted via leads 218 and 1107 to the input terminal of the Ten-Second Timer 1108, thereby starting it. If before ten seconds have elapsed the calling customer hangs up, a "Questionable Call" symbol is recorded on the tape and the observing apparatus is only partly reset, thereby remaining in an activated condition to observe another attempt to complete a call by the same calling customer. If, however, the calling customer does not hang up until after ten seconds have elapsed, the call is deemed to have been placed correctly and the observing apparatus is completely reset, thereby making it available to observe the next placed call over any one of the line concentrators.

Now assuming that ten seconds elapsed before the calling customer hangs up, the Ten-Second Timer 1108 will have timed out and a relatively high potential will be conducted from the 1 terminal thereof over lead 1109 to the center input terminal of the Ten-Second-Timer AND circuit 1205. Since, as mentioned before, the lower input terminal is activated over the obvious path from the 1 lead of flip-flop 1200, the next timing pulse which is received from conductor 818 over conductors 1102, 1110, and 1206 causes AND circuit 1205 to emit a corresponding pulse which switches End-Of-Observation flip-flop 1207 to its 1 state. Accordingly, Timing AND circuit 910 is again disabled by the removal of potential from conductor 1208, and the lower input terminal of End-Of-Observation AND circuit 1209 is activated over the obvious path. Since, as mentioned before, the upper terminal of End-Of-Observation AND circuit 1209 is activated by the relatively high potential conducted thereto from the 1 terminal of flip-flop 1606 via conductors 1615, 1210, and 1211, the next timing pulse received from conductor 1206 over conductor 1212 causes AND circuit 1209 to emit a pulse which is conducted therefrom in three directions: the first is over conductor 1213 to the recording circuits of Fig. 17; the second is over conductor 1214 to the reset terminal of flip-flop 1207; and the third is over conductor 1215 through Reset OR circuit 1111 to the Reset Multivibrator 1112, thereby activating it to emit a resetting pulse.

Reset Multivibrator 1112 is of the one-shot type and therefore, when activated, emits one pulse which is conveyed in one direction through reset amplifier 1113 and thence over conductors 1114 and 1115 to reset the various flip-flops throughout the observing apparatus. In another direction, the reset pulse is conducted over lead 1116 through Reset-One OR circuit 1117 and thence to the Reset-One Multivibrator 1118. In response thereto, multivibrator 1118 emits one pulse which, after amplification in RS1 Amplifier 1119, is conducted over lead 1120 and other leads connected thereto to reset various other flip-flops throughout the observation apparatus.

Observation is now completed and the circuits are prepared to recognize the next request for service by a customer at any one of the line concentrators.

The hereinbefore-described circuit operations relate to a call which is completed and which appears to result in the desired connection. Of course, it is possible that a wrong number may be involved even though the calling customer does not hang up until after ten seconds have transpired from the initial speech; however, it is deemed to be sufficiently likely that such call is the one desired by the calling subscriber to make such assumption in all cases.

*Dialing of a service code*

If instead of dialing a standard 7-digit number, the calling customer dials a service code such as 0, 411, or 211, the circuits operate somewhat similarly to record certain of the information hereinbefore described with respect to the standard 7-digit call. Operation of the circuits is identical to that described up until the point at which the dialed digits are registered. Here, special circuits are provided to recognize any one of the service codes and to activate the digits recording circuits even though seven digits have not been received. This is accomplished in the following manner.

Assuming that the dialed service code is 0, ten pulses will be received by First-Digit AND circuit 1401 from pulsing leads 1402 and 1500. These pulses are counted in the First-Digit Counters 1403–1406. After the last pulse has been received, the counters are in the following states: 1403 is in the 0 state; 1404 is in the 1 state; 1405 is in the 0 state; and 1406 is in the 1 state. During the period of time following receipt of the last pulse, Stepping-Tube 1003 is switched to its No. 2 electrode and all of the input terminals to the First-Digit-0 AND circuit 1407 are activated. Accordingly, conductor 1448 is energized, thereby activating Service-Code OR circuit 1512 and the Service Code flip-flop 1513. Flip-flop 1513 is switched to its 1 state and an actuating potential is conducted from the No. 1 terminal thereof over lead 1514 through Dialing-Complete OR circuit 1023 to the input terminal of the Dialing-Complete flip-flop 1024, thereby switching it to its 1 state. Dialing-Complete AND circuit 1025 is thereby enabled, and subsequent operations are performed in an identical manner to that heretofore described. Of course, the recorded digits will be different in this example because the digits registered in the counters are different. Here, the only digit registered is the digit 0. Therefore, the seven symbols recorded on the tape will be a symbol representing the digit 0, and six symbols each of which represents no dialed pulses. Thus, for example, when the First-Digit Counters are read out in response to activation of the Record-First-Digit flip-flop 1414 and receipt of the next timing pulse, First-Digit AND circuits 1415, 1418, 1419, and 1422 will be activated and the four conductors leading therefrom over cable 1431 to the recording apparatus will be correspondingly pulsed.

When the Second through the Seventh Digit Counters are read out, AND circuits connected to the 0 leads of the counters will be activated, and the conductors connected thereto will be pulsed to actuate the recording heads. Thus, for example, when the Second-Digit Counters are read out, Second-Digit AND circuits 1434, 1436, 1438, and 1440 are activated.

If, instead of the digit 0, one of the other service codes ending in 11 such as 411 or 211 is dialed, Service-Code AND circuit 1515 is rendered electrically effective thereby to activate Service-Code OR circuit 1512 and flip-flop 1513. This is accomplished in the following manner.

When the second digit is 1, the Second-Digit Counters in registering the digit assume the following states: counter 1442 is in the 1 state, and the remaining counters 1443–1445 are in their 0 states. Accordingly, the four conductors 1449 leading from the Second-Digit Counters to Service-Code AND circuit 1515 are activated. Similarly, when the Third-Digit Counters 1516–1519 have registered the digit 1, the four conductors 1520 leading therefrom to AND circuit 1515 are energized. Accordingly, when the fourth electrode of Stepping Tube 1003 is activated during the pause following receipt of the third digit impulses, the potential conducted over lead 1017 completes the enablement of AND circuit 1515, and voltage conducted therefrom is passed through the Service-Code OR circuit 1512 to switch Service-Code flip-flop 1513 to its 1 state.

Dialing-Complete OR circuit 1023 is thus activated over conductor 1514, the Dialing-Complete flip-flop 1024 is correspondingly switched, and subsequent operations conform to the description heretofore set forth.

*Operation when the first digit is 1*

Occasionally, due to inadvertent operation of switchhook contacts or shorting of the line, a spurious impulse is received. Ordinarily there will be only one such impulse and it may appear to the registration circuits as a dialed digit 1. Accordingly, circuits are provided to respond when the first digit is 1 thereby to record a symbol representative thereof and thereafter to reset the line concentrator equipment for observation of another call.

Turning specifically to the First-Digit Counters 1403–1406, it will be noted that output lead 1 of counter 1403 and the 0 output leads of counters 1404–1406 are severally connected to corresponding input terminals of the First-Digit-One AND circuit 1408. Accordingly, when Stepping Tube 1003 is stepped to its No. 2 electrode, the remaining input lead to AND circuit 1408 is activated via conductor 1014, and the First-Digit-One flip-flop 1450 is switched by potential conducted thereto over lead 1451. A relatively high potential is conducted over lead 1452 to the lower input terminal of the HIT AND circuit 1036. Therefore, when the next timing pulse is received over conductors 1104 and 1037, it causes AND circuit 1036 to emit a pulse which switches HIT flip-flop 1038 to its 1 state. Timing AND circuit 910 is disabled by the removal of potential from one of its input terminals over conductor 1039, an input terminal of Incomplete-Dialing AND circuit 1121 is deactivated over conductors 1039 and 1144, and Digit-One AND circuit 1040 is enabled by potential conducted to the lower input terminal thereof over the obvious path. In addition, Reset Multivibrator 1112 is activated by potential conducted from lead 1041 through OR circuit 1111. However, multivibrator 1112 has a time delay characteristic such that it does not emit a reset pulse until after another timing pulse has been generated. Accordingly, when the next timing pulse is received from conductors 1104 and 1042, Digit-One AND circuit 1040 responds by emitting a corresponding pulse which passes over lead 1043 to reset HIT flip-flop 1038 and over lead 1044 to the recording circuits of Fig. 17.

Almost immediately after the last-mentioned timing pulse is received, Reset Multivibrator 1112 emits a reset pulse which is effective to reset the circuits in the manner heretofore described.

*Recording of false start symbol*

Customers sometimes hang up after dial tone has been furnished but before dialing any digits. Disconnect under these conditions is known as a false start and an appropriate symbol is recorded on the magnetic tape.

Operation of the observing circuits is identical with that already described up to the point at which dialing begins. However, instead of receiving dialed digits, the apparatus receives a subscriber disconnect signal. Accordingly, Subscriber Disconnect Detector 205 emits a pulse which sets flip-flop 216 to its 1 state. An enabling potential is therefore conducted over leads 219 and 819 to the next-to-the-lowest input terminal of Subscriber-Disconnect AND circuit 922. Since the uppermost input terminal thereof is activated over conductor 301 from the 0 terminal of Dial-Pulse flip-flop 300, and since FUR flip-flop 912 is in its 0 state (having been reset as hereinbefore described), AND circuit 922 responds to the next timing pulse by emitting a corresponding pulse which switches False-Start flip-flop 923 to its 1 state. Timing AND circuit 910 is now disabled by the removal of potential from one of its input terminals over conductor 928.

When the next timing pulse is received over conductor 803, it causes False Start AND circuit 924 to emit a corresponding pulse which is conducted over three paths: one, via conductors 925, 926, and 1216 to the recording circuits of Fig. 17; another, via conductors 925, 926, and 1217 through Reset OR circuit 1111 to actuate Reset Multivibrator 1112; and the third via conductors 925 and 927 to reset flip-flop 923.

The circuits are now completely reset and are prepared for observation of another call.

*Partial resetting to make second observation of same line*

As mentioned before, the observing circuits are not always completely reset when a calling customer hangs up. Instead, when any one of the following conditions prevails, the circuits remain in a partially activated condition for observation only of a call initiated by the same subscriber during the following 60-second interval. These conditions relate to incomplete dialing, don't answer, busy back, and a questionable call. Each of these will now be individually described.

First, considering the condition of incomplete dialing, it may be noted that the circuits operate in the manner hereinbefore described up to and including the recording of a mark signifying the commencement of dialing. When the customer hangs up before having dialed either a complete service code or seven digits, the Incomplete Dialing AND circuit 1121 is enabled. The uppermost input terminal of AND circuit 1121 is activated over conductors 335 and 1143 from the 1 terminal of Dialing flip-flop 303, the next-to-the-uppermost input terminal of AND circuit 1121 is activated over conductors 219 and 1117 from the 1 terminal of flip-flop 216; the center input terminal is activated over conductor 1045 from the 0 terminal of flip-flop 1028; and the next-to-the-lowest input terminal is activated by the next timing pulse received over conductors 1102 and 1123; and the lowest input terminal is activated over conductors 1039 and 1144 from the 0 terminal of HIT flip-flop 1038. Accordingly, Incomplete-Dialing flip-flop 1124 is switched from its 0 to its 1 state, thereby disabling Timing AND circuit 910, enabling Incomplete-Dialing-Record AND circuit 1125 over the obvious path, switching Make-Second-Observation flip-flop 1101 over conductor 1128 and the obvious path through OR circuit 1129, and actuating RS1 Multivibrator 1118 over conductor 1128 and the obvious path through OR circuit 1117. Fip-flop 1101, in switching, actuates the Sixty-Second Timer 1130 over conductor 1100 and 1145; enables input AND circuits 702 and 703; and introduces inhibiting potential to INHIBITOR circuit 716 via conductor 1146, OR circuit 1134 and conductor 1135 thereby preventing the immediate reactivation of multivibrator 903 and flip-flop 904 when they are reset by a pulse from RS1 Multivibrator 1118.

RS1 Multivibrator 1118 is characterized by having a time delay of sufficient duration to permit circuit response to the next timing pulse before emitting a resetting pulse. Therefore, when the next timing pulse is received from conductor 1102, it causes AND circuit 1125 to emit a pulse which travels in two directions: one is over conductor 1126 to the recording circuits of Fig. 17; and the other is over conductor 1127 to the reset terminal of flip-flop 1124 thereby resetting it to its 0 state. A pulse is now emitted by RS1 Multivibrator 1118, is amplified by RS1 Amplifier 1119, and is conducted to predetermined ones of the flip-flops within the observing apparatus, thereby to effect partial circuit resetting only.

Figure 5:
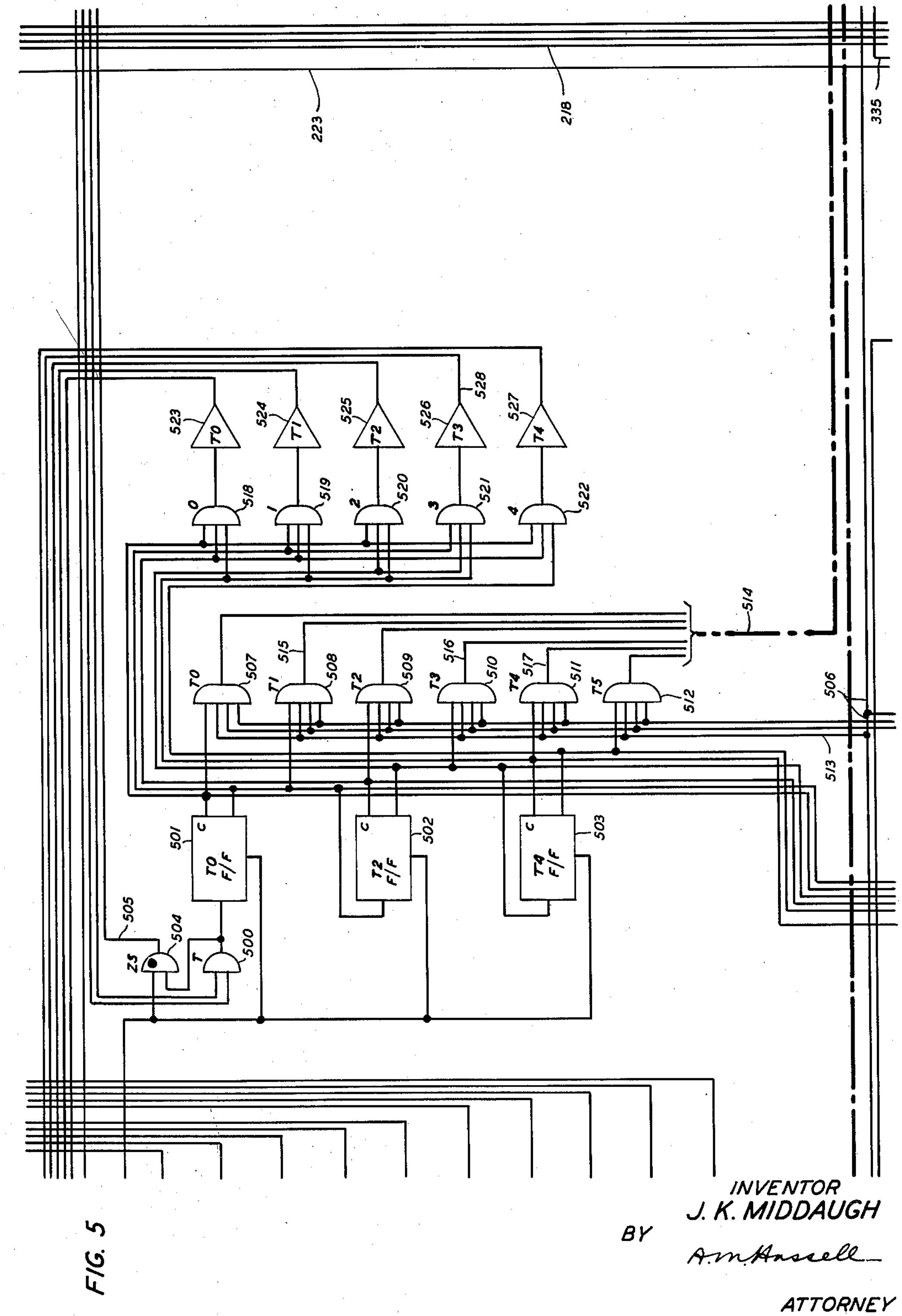
Figure 6:
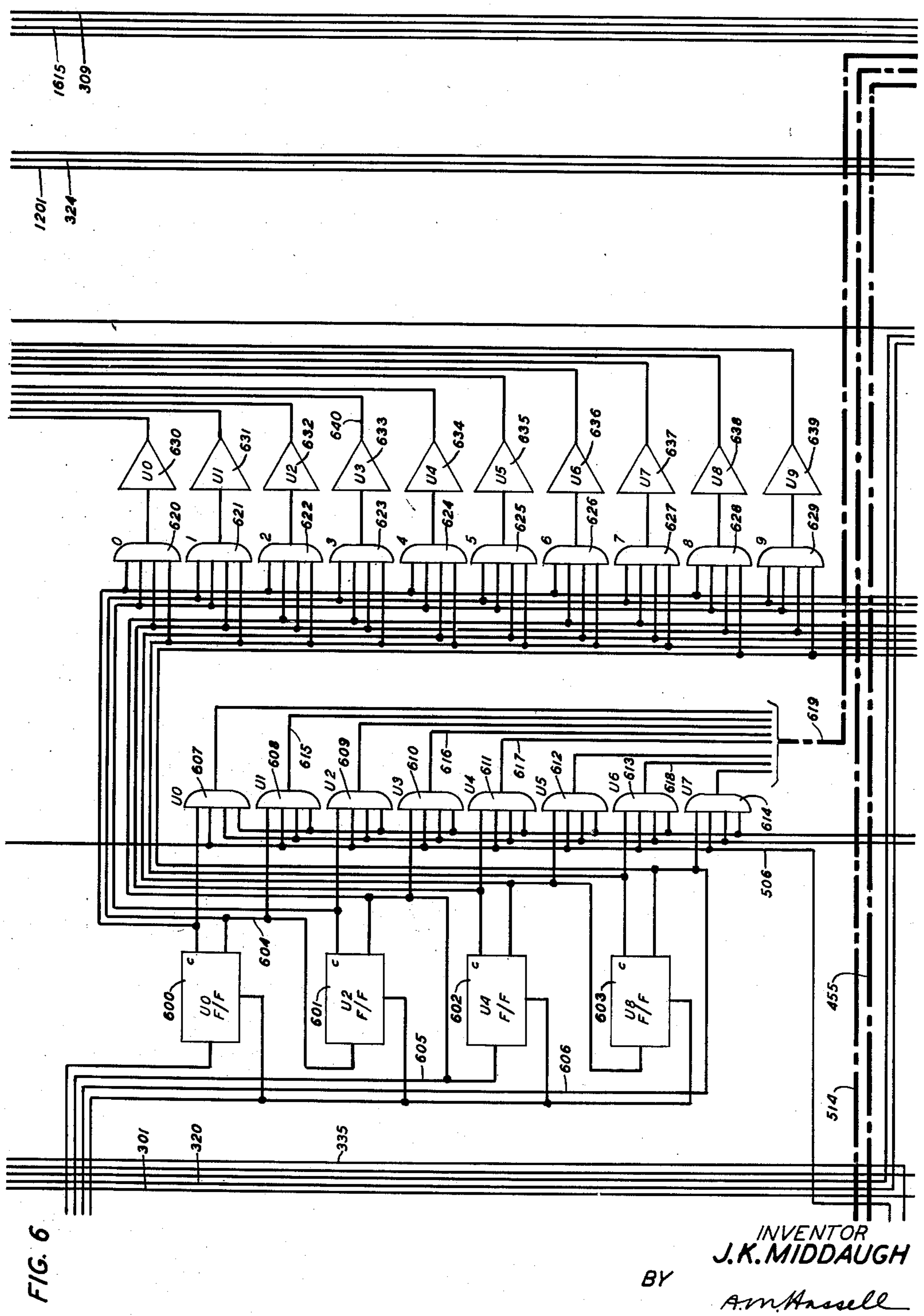
Figure 7:
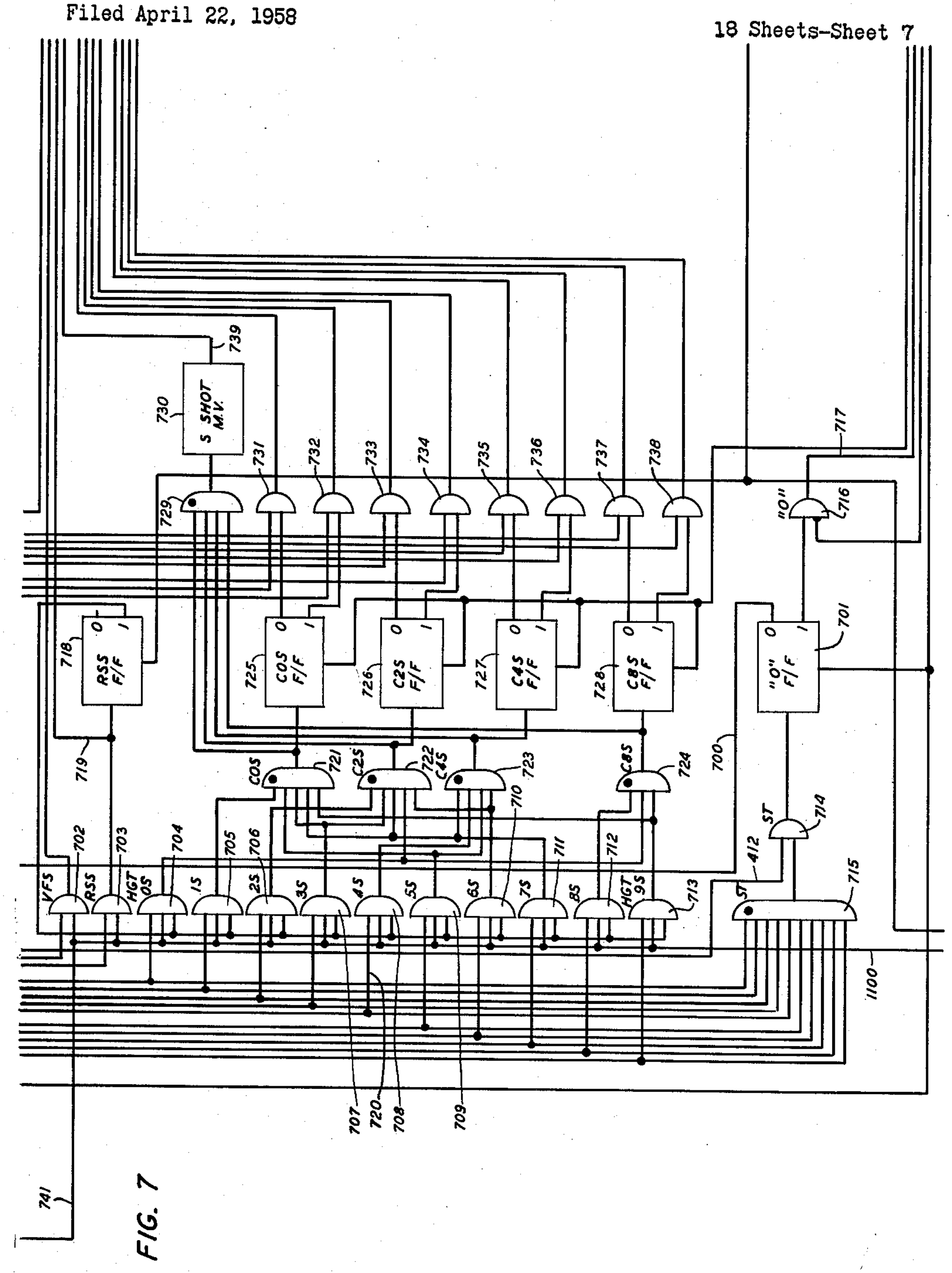
Figure 14:
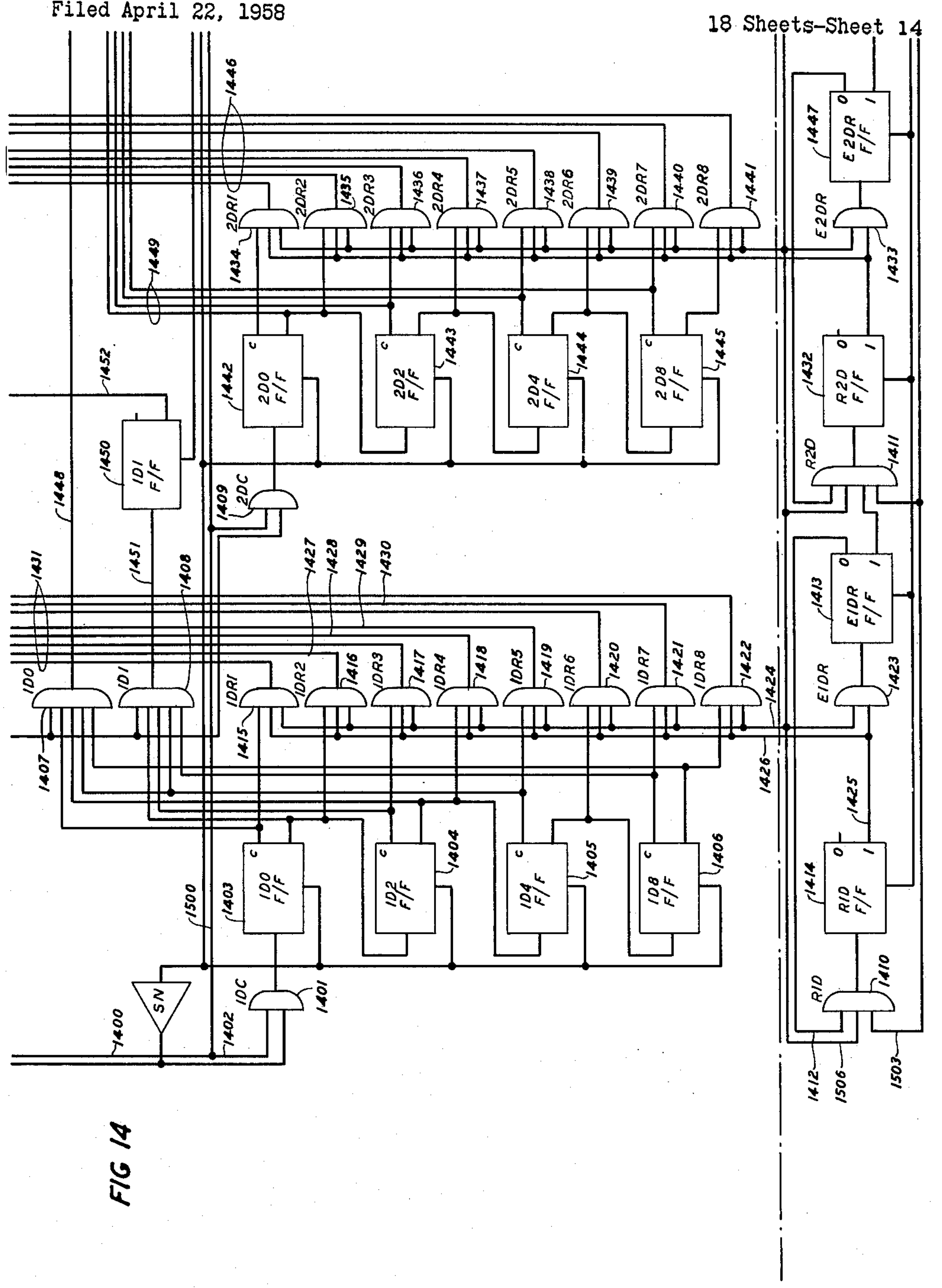
Figure 15:
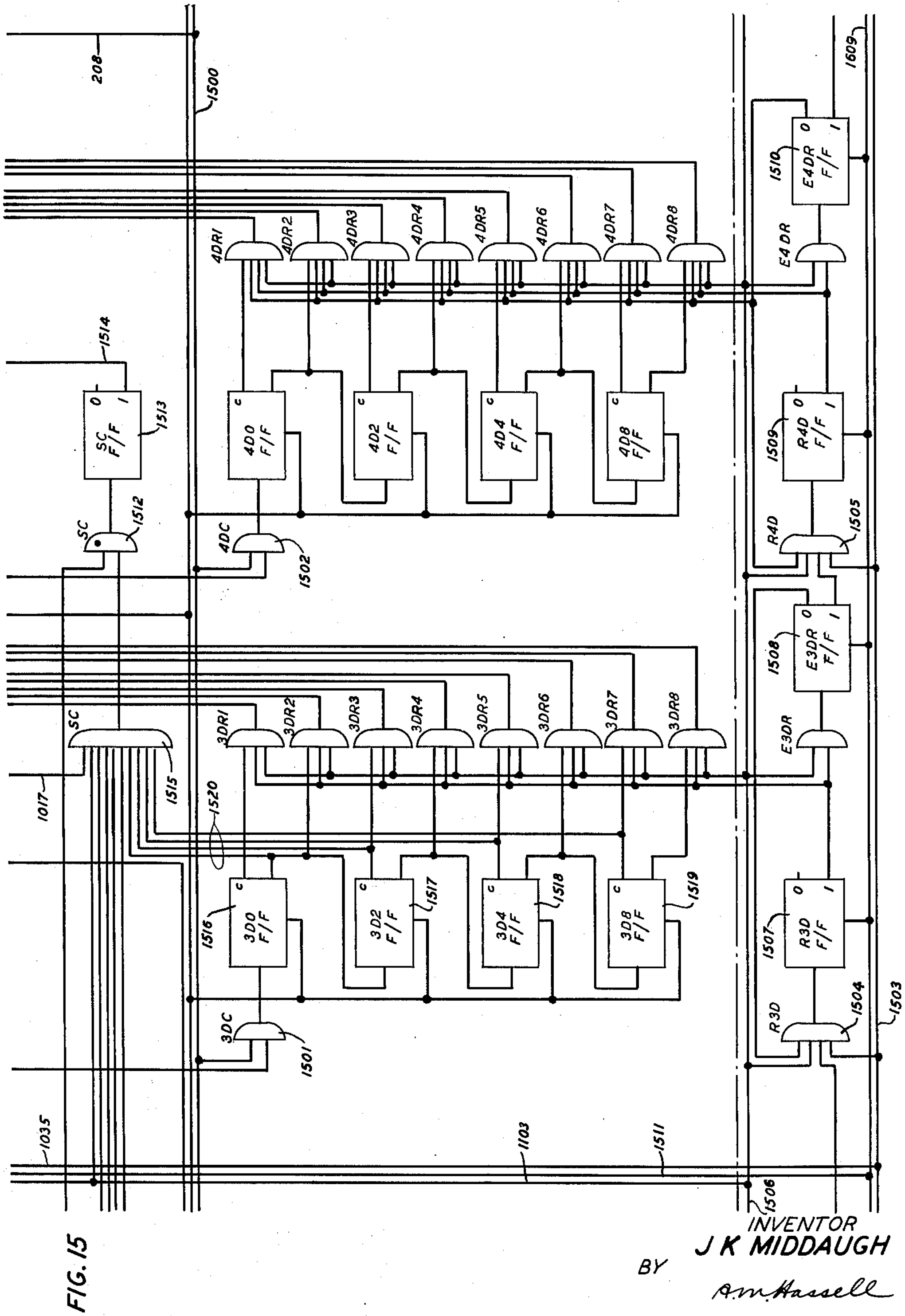
Figure 16:
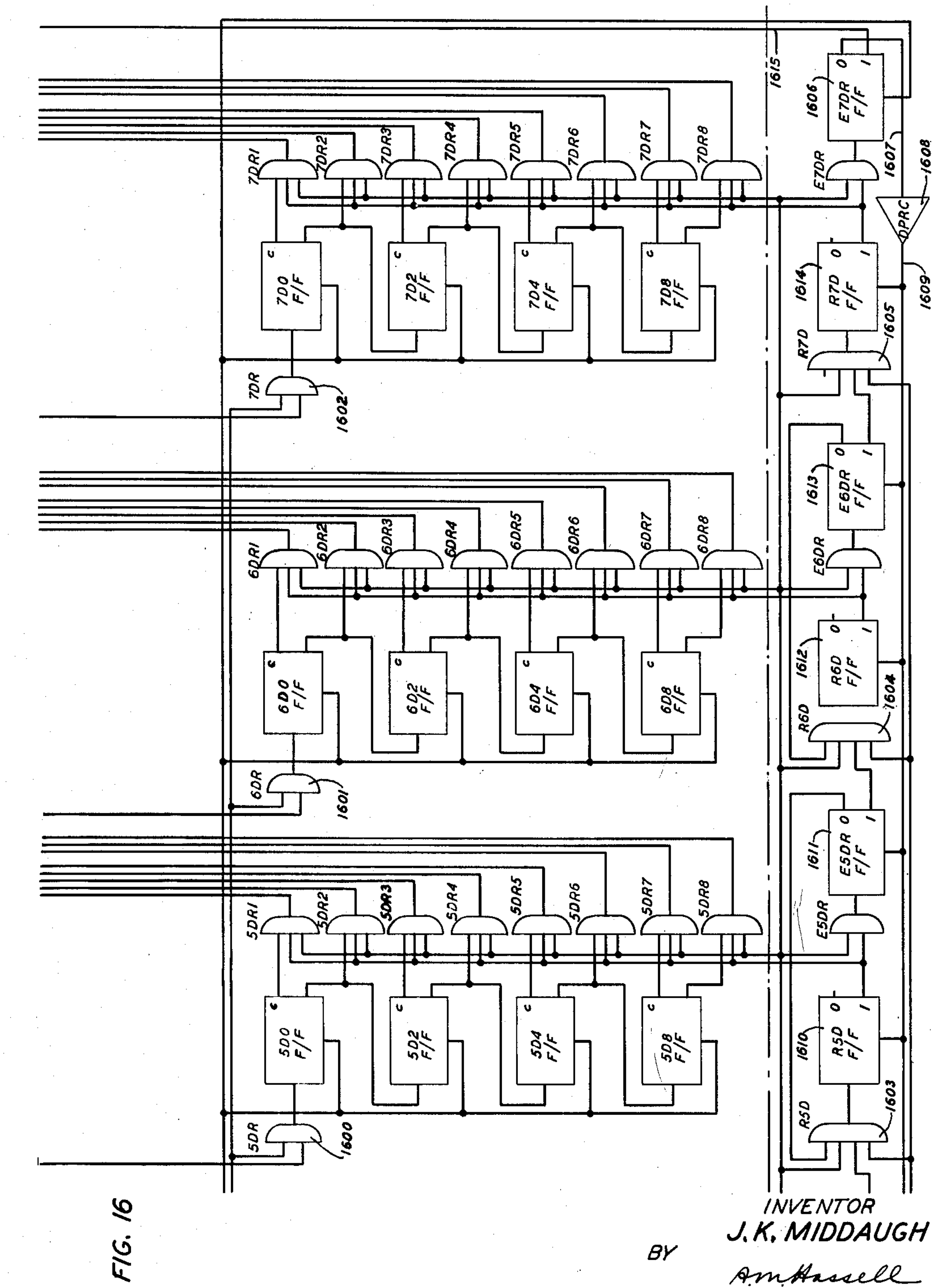

Although the dialed digit counting circuits of Figs. 14, 15, and 16, together with certain other circuits, are reset by the RS1 pulse, the counters in Figs. 4, 5, and 6 retain the aforementioned information which identifies the line of the calling customer. Thus, information is available against which a comparison may be made by other counting circuits now to be described.

*Line comparison*

When the calling customer hangs up, his Preference flip-flop (one of the flip-flops 102–107) is reset and the trunk over which the call was monitored is therefore effectively disconnected by disablement of the previously enabled Line-And-Preference-Number AND circuit of Fig. 1. The input AND circuits of Fig. 4 (circuits 400–411) continue to be disabled because of the absence of potential on conductor 700 from Off-Normal flip-flop 701. However, certain input AND circuits of Fig. 7 (704–713) are partially enabled by potential conducted thereto via lead 1100 from the 1 terminal of Make-Second-Observation flip-flop 1101. Input AND circuits 704–713 now await complete enablement which occurs when RSS flip-flop 718 is set to its 1 state by a pulse emitted by AND circuit 703 when the aforementioned reset pulse is received thereat from RS Amplifier 419 over conductor 479.

Not only is the reset pulse effective to cause switching of RSS flip-flop 718, but in addition, it is effective to cause resetting of the Units and Tens Counters 820–826 over conductor 719, RSS OR circuit 929, conductor 930, conductor 827 and OR circuits 828 and 829.

The Tens and Units Counters 820–826 are now in synchronism with the line concentrator and continue to follow the line scanning until a request for service is recognized by the receipt of a pulse through one of the ten HGT amplifiers 423–431.

As scanning progresses, the number of each line being scanned is compared with the number of the line over which the previous call was placed. This is accomplished by Units and Tens Digits Comparison AND circuits 830–844. When scanning progresses to a line over which a request for service is recognized, an HGT pulse is emitted and is conducted over one of the leads in cable 440 to one of the HGTS AND circuits 704–713. The particular one of these AND circuits to which the pulse is conducted emits a corresponding pulse which sets Concentrator Number flip-flops 725–728 to states which combinationally represent the concentrator number. AND circuits 731–738 compare this number with the number of the concentrator in which the previously observed call originated. At the same time, Single-Shot Multivibrator 730 is activated from one or more of OR circuits 721–724, and a pulse is conducted over lead 739 to input terminals of Same-Subscriber AND circuit 932 and Different-Subscriber INHIBITOR circuit 931.

If the line and concentrator numbers match, AND circuit 845 is activated and emits a potential which is conducted over the obvious paths to the inhibiting terminal of Different-Subscriber INHIBITOR circuit 931 and to an input terminal of Same-Subscriber AND circuit 932. Accordingly, AND circuit 932 emits a pulse which is effective over the obvious path to switch Same-Subscriber flip-flop 900 to its 1 state. However, the potential conducted to the inhibiting terminal of INHIBITOR 931 is effective to prevent the emission of a pulse therefrom.

If, on the other hand, the line and concentrator numbers do not all match, AND circuit 845 does not emit a potential and therefore the pulse emitted by multivibrator 730 is ineffective to activate AND circuit 932 but is effective to cause INHIBITOR circuit 931 to emit a pulse which is effective through No-Match OR circuit 933 and conductor 934 to reset flip-flops 725–728, thereby preparing them for the next concentrator number matching check.

If, according to the selected example, an HGT pulse is received over conductor 441 at the time scanning has progressed to line 33, Concentrator-Number flip-flop 727 is switched from its 0 to its 1 state. At the same time, Single-Shot Multivibrator 730 is activated over the obvious path from OR circuit 723 through OR circuit 729. Accordingly, a match check pulse is emitted and conducted over lead 739 to the aforementioned input terminals of AND circuit 932 and INHIBITOR circuit 931.

Since the selected example coincides with that heretofore assumed for the original call, all of the input terminals to AND circuit 845 will be enabled, thereby causing AND circuit 845 to emit a match-check potential. This is accomplished in the following manner.

An examination of the individual matching AND circuits 830–844 and 731–738 reveals that each thereof has two input terminals. One of these terminals is connected to an output terminal of the associated flip-flop, whereas the remaining input terminal is connected to the corresponding terminal of the counterpart flip-flop in Figs. 4, 5, and 6. Accordingly, unless the two flip-flop terminals to which an AND circuit is connected are resident in the same electrical condition, the AND circuit will not produce an output potential. Since each of the output terminals of flip-flops 436–439 is individually matched against the corresponding terminal of flip-flops 725–728, since each of the output terminals of flip-flops 501–503 is individually matched against the corresponding terminal of flip-flops 824–826, and since each of the output terminals of flip-flops 600–603 is matched against the corresponding terminal of flip-flops 820–823, it will be apparent that an electrical potential will appear on all of the output leads of matching AND circuits 731–738 and 830–844 only when the digits identifying the previous calling line are identical with those identifying the line over which the second attempt is made.

As mentioned before, if the numbers do not check, no potential is emitted by AND circuit 845, and the match check pulse emitted by Single-Shot Multivibrator 730 is ineffective to activate AND circuit 932 but is effective to activate INHIBITOR circuit 931. Accordingly, if there is no match a potential is conducted over the heretofore traced path via lead 934 to reset the Concentrator Number flip-flops 725–728, thereby preparing them for receipt of the next HGT pulse received during the aforementioned sixty-second interval. The Units and Tens Digits Counters, however, are not reset because it is desired that they continue in synchronism with the line concentrator control circuit.

The matching circuits continue to check the identity of each line over which a request for service is initiated until either a match is obtained or until sixty seconds expire. If after sixty seconds no match is found, the Sixty-Second Timer 1130 times out, thereby actuating Reset Multivibrator 1112 over the obvious path through OR circuit 1111. Accordingly, multivibrator 1112 emits a pulse which, as hereinabove described, is effective to completely reset the concentrator observing circuits.

Figure 8:
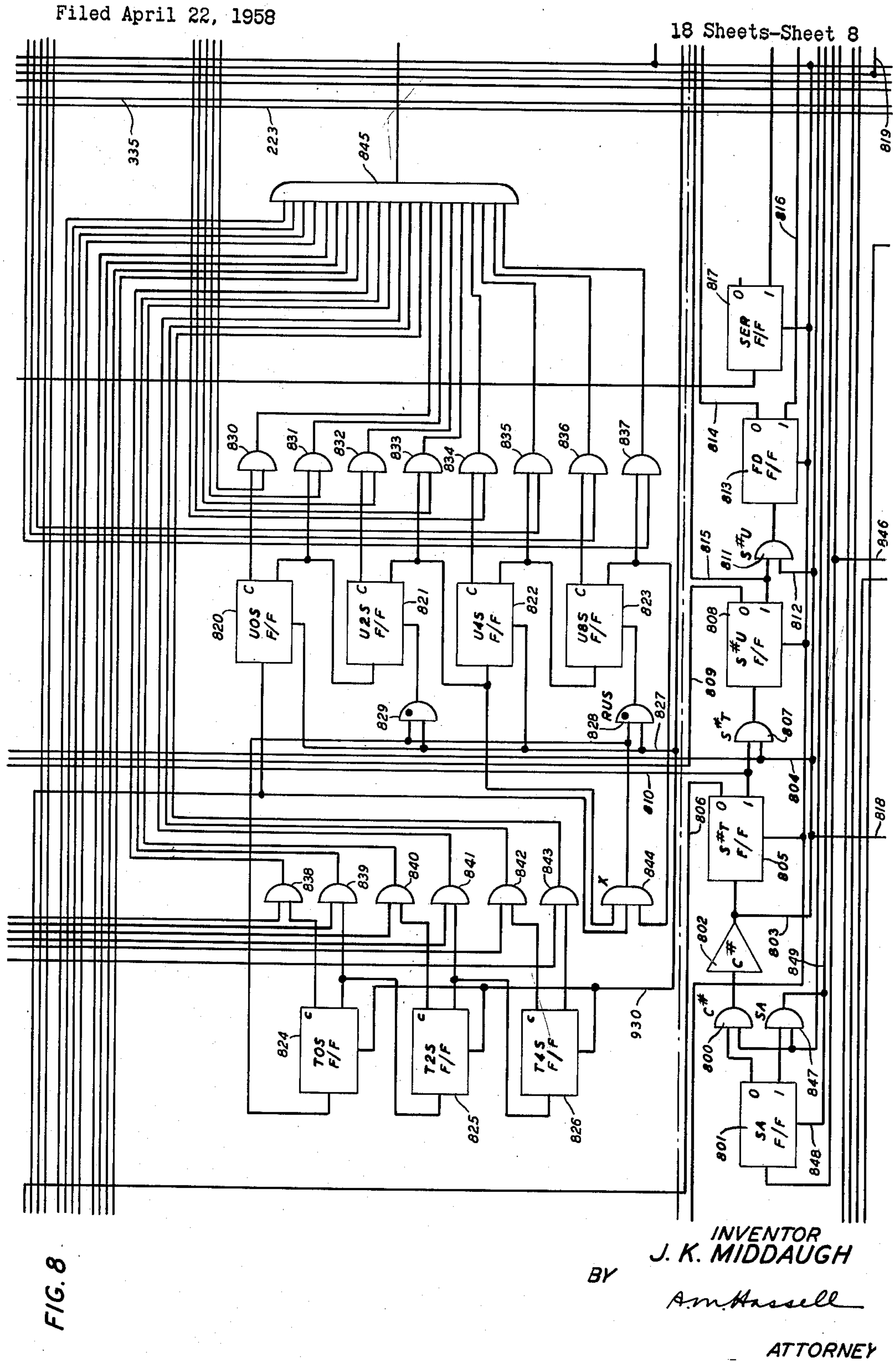
Figure 9:
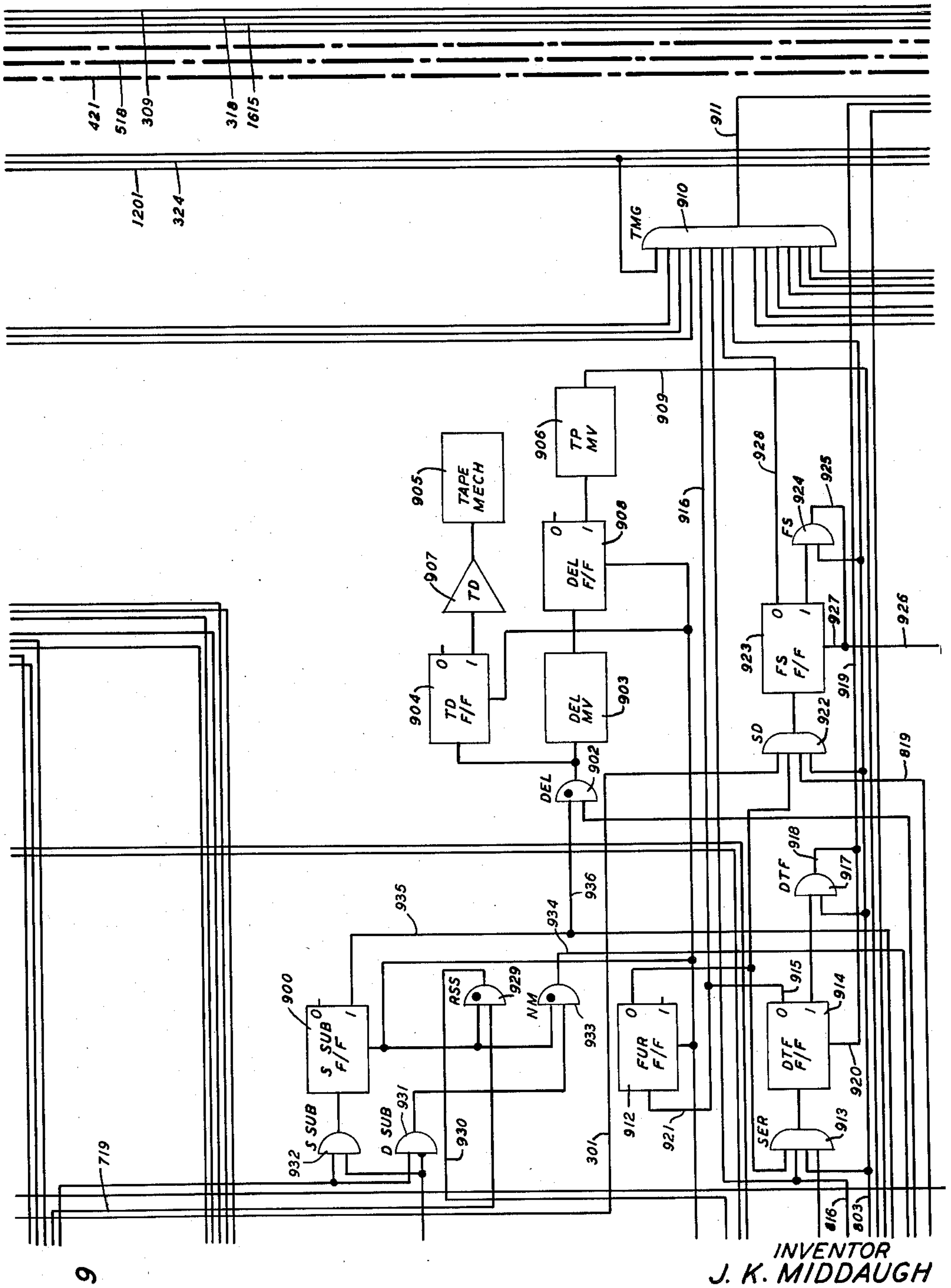
Figure 10:
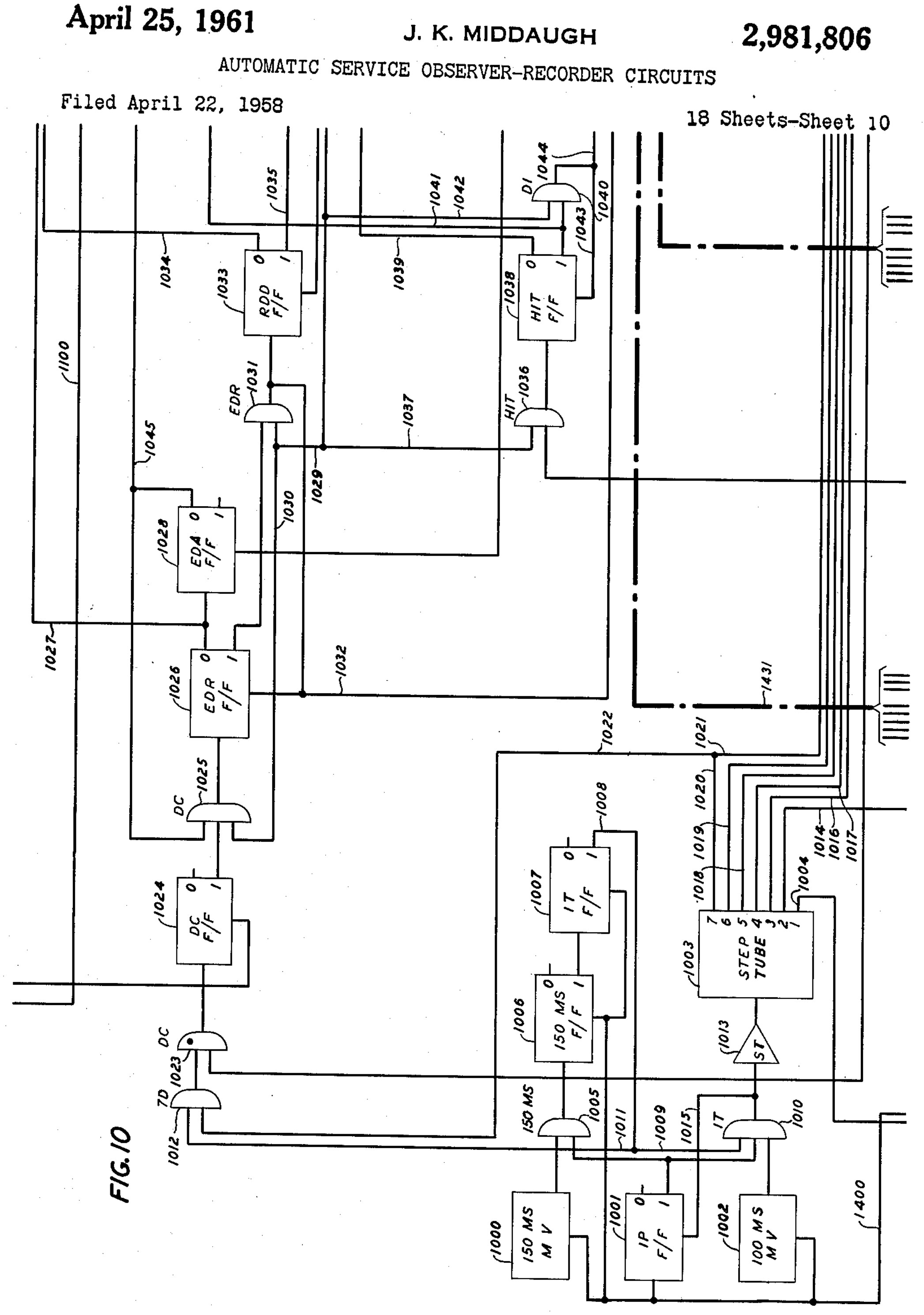

Returning now, however, to the conditions that prevail when a match occurs, it will be recalled that the match-check pulse emitted by multivibrator 730 is effective to switch Same-Subscriber flip-flop 900 to its 1 state but that it is ineffective to activate Different-Subscriber Inhibitor circuit 931. Accordingly, flip-flops 725–728 are not reset, and a relatively high potential is conducted from the 1 terminal of flip-flop 900 to perform several functions. The potential is conducted over leads 935 and 936 through OR circuit 902 to the above-described tape-mechanism and timing-pulse circuits thereby to initiate movement of the recording tape and the generation of timing pulses. The potential is additionally conducted via lead 935 to the input terminal of Second-Attempt flip-flop 801 thereby switching it to its 1 state. It is further conducted from lead 935 over lead 846 to reset the Sixty-Second Timer over the obvious path thereby to prevent it from timing out. The potential is also conducted through Make-Second-Observation Reset OR circuit 1132 to the reset terminal of Make-Second-Observation flip-flop 1101 thereby resetting it to its 0 state, and in addition, it is conducted from lead 846 over lead 1133 through OR circuit 1134 over conductor 1135 to the inhibiting terminal of Inhibitor circuit 716. When the Make-Second-Observation flip-flop 1101 is switched back to its 0 state, potential is removed from its 1 lead thereby disabling input AND circuits 703–713 over conductor 1100 and uninhibiting INHIBITOR circuits 116–121 via conductor 741, OR circuit 122 and conductor 123. The counters of Figs. 7 and 8 are thus prevented from further change and, since a match has been found, the Preference flip-flops 102–107 are rendered responsive to operation of the TS relays (Fig. 1) when the customer's line is connected to a trunk.

Flip-flop 801 is now in its 1 state and therefore the upper input terminal of Second-Attempt AND circuit 847 is activated over the obvious path. Accordingly, when the next timing pulse is received at the lower input terminal thereof over conductor 909, AND circuit 847 emits a corresponding pulse which is conducted in one direction over lead 848 to reset Second-Attempt flip-flop 801 and in another direction over lead 849 to the recording circuits of Fig. 17.

The concentrator control circuits now connect the calling line to one of the six trunks to which it has access, and observation of the call now proceeds in a manner identical to that hereinbefore described. If the call proceeds in a normal fashion, the observing apparatus will completely reset itself ten seconds after speech is first observed over the trunk. However, if the call terminates in one of the aforementioned ways which would normally result in partial resetting and observation of a second attempt, the circuits will conform thereto and actually observe a third attempt if made during the following sixty seconds.

*Operation when called party does not answer*

As mentioned above, when the called party does not answer and the calling party hangs up, the observing circuits reset themselves only partially and remain in a semi-activated state to observe any subsequent attempt to place a call by the same calling party during the following sixty seconds. This is accomplished by circuits which will now be described in detail.

Until the called party answers, flip-flop 321 will reside in its 0 state and a relatively high potential will be conducted therefrom over lead 324 to the center input terminal of Don't-Answer AND circuit 1105. When the calling party hangs up, Subscriber-Disconnect-Detector 205 emits a pulse which is effective to switch Subscriber-Disconnect flip-flop 216 to its 1 state. Therefore, an enabling potential is conducted from the 1 terminal thereof over leads 219, 1122, and 1136 to the next-to-the-uppermost input terminal of AND circuit 1105. The next-to-the-lowest input terminal is activated by potential conducted thereto from the 1 terminal of Dialing flip-flop 303 via conductor 335, and the lowest input terminal is activated by potential conducted thereto from the 1 terminal of Ringing-Tone flip-flop 210 via conductors 212 and 223. Accordingly, when the next timing pulse is received over conductor 1102, it causes AND circuit 1105 to emit a corresponding pulse which switches Don't-Answer flip-flop 1106 to its 1 state. Don't-Answer-Record AND circuit 1137 is thus enabled to respond to the next timing pulse received from conductor 1110 over the obvious path by emitting a corresponding pulse which is passed over conductor 1138 to the recording circuits of Fig. 17. At the same time, Timing AND circuit 910 is disabled by the removal of potential from conductor 1139.

The relatively high potential now appearing on the one lead of flip-flop 1106 not only enables AND circuit 1137 but in addition is effective over conductor 1140 to activate RS1 Multivibrator 1118 and to switch Make-Second-Observation flip-flop 1101 to its 1 state. After a brief time delay, multivibrator 1118 emits a pulse which, as hereinbefore described, is effective to reset only certain preselected ones of the service observing apparatus components.

The circuits now remain in a semi-activated condition to await the initiation of a call by the same subscriber during the following sixty seconds.

*Operation when the called line is busy*

When the called line is busy, Busy-Back Detector 204 emits a pulse which is effective through Busy-Back Inverting Amplifier 220 to switch Busy-Back flip-flop 221 to its 1 state. Accordingly, an activating potenial is conducted from the 1 terminal thereof over lead 222 to the uppermost terminal of Busy-Back Detector 1 AND circuit 327. Since the lower input terminal thereof is activated by potential conducted thereto from the 0 terminal of Busy-Back Detector 2 flip-flop 328, the next timing pulse which is received at the center input terminal over the obvious path from conductor 506 causes AND circuit 327 to emit a corresponding pulse which switches Busy-Back Detector 1 flip-flop 329 to its 1 state, thereby activating the lower input terminal of Busy-Back Detector 2 AND circuit 330.

The removal of potential from the 0 terminal of flip-flop 329 is effective over conductor 331 to disable Timing AND circuit 910 and is also effective over conductors 331 and 332 to switch flip-flop 328 to its 1 state. This latter operation is accomplished by a negative pulse which is derived from the drop in potential by a differentiating circuit which is included in the input circuits of flip-flop 328.

The upper input terminal of AND circuit 330 is activated by potential conducted thereto over lead 1615 from the 1 terminal of flip-flop 1606 (the dialed digits having already been recorded), and therefore the next timing pulse which is conducted to the center input terminal of AND circuit 330 via lead 307 results in the emission of a corresponding pulse which is effective over the obvious path to reset flip-flop 329, and which is effective over conductor 333 to activate the recording circuits of Fig. 17.

Since flip-flop 328 is in its 1 state, a relatively high potential is conducted from the 1 terminal thereof over lead 334 to the upper input terminal of Busy-Back Detector AND circuit 1141. Therefore, when the calling party hangs up and Subscriber-Disconnect Detector flip-flop 216 is switched to its 1 state, an enabling potential is conducted over leads 219, 1122, and 1142 to the lower input terminal of AND circuit 1141 thereby causing AND circuit 1141 to emit a corresponding potential which is conducted over the obvious paths to activate multivibrator 1118 and the Make-Second-Observation flip-flop 1101. Accordingly, the concentrator circuits are again partially reset to await another attempt by the same customer during the ensuing sixty seconds.

*Operation when the call is a questionable one*

A questionable call is a call that is terminated prior to ten seconds after the first speech has been transmitted over the trunk. The reason that it is deemed to be questionable is that it is not known whether the call was directed to the desired party or whether it resulted in a wrong number. Of course, it is not certain that a calling customer will dial again within sixty seconds after having been connected to the wrong party, but in view of the likelihood that such will occur, provision is made to retain the circuits in the aforementioned semi-activated condition during the sixty-second interval following the termination of a questionable call. This is accomplished in the manner now to be described.

As heretofore mentioned in connection with the discussion relating to the completion of a normal call, Ten-Second Timer 1108 times out 10 seconds after speech has first been detected on the trunk. However, in the interim, an activating potential is conducted from the timer 0 terminal over the obvious path to the next-to-the-lowest input terminal of Questionable-Call AND circuit 1204. The next-to-the-uppermost input terminal is activated by potential conducted thereto from Speech-Detection AND circuit 214 over lead 218, and the uppermost input terminal is activated by potential conducted thereto from Subscriber-Disconnect Detector flip-flop 216 over lead 219. Therefore, when the next timing pulse is received at the lowest input terminal from conductor 1110 over conductor 1218, it causes AND circuit 1204 to emit a corresponding pulse which switches Questionable-Call flip-flop 1219 from its 0 to its 1 state. Timing AND circuit 910 is now disabled by the removal of potential from one of the input terminals thereof over conductor 1220; the lower input terminal of Questionable-Call-Record AND circuit 1221 is activated over the obvious path; and RS1 Multivibrator 1118 and Make-Second-Observation flip-flop 1101 are activated over the obvious paths from conductor 1222. However, before multivibrator 1118 emits its partial resetting pulse, another timing pulse is received at the center input terminal of AND circuit 1221. Since the upper input terminal thereof is activated by potential conducted thereto over leads 1615 and 1210, the timing pulse causes AND circuit 1221 to emit a corresponding pulse which is conducted over the obvious path to reset flip-flop 1219 and over conductor 1223 to the recording circuits of Fig. 17. Thus, a questionable-call mark is recorded on the tape and the circuits are partially reset to await another attempt by the same calling party during the following sixty seconds.

Although the invention has been illustrated by one particular embodiment thereof, the invention is not limited to the specific apparatus and the particular arrangement therein disclosed. Various applications, modifications, and arrangements of the invention will readily occur to those skilled in the art.

The terms and expressions hereinbefore employed in reference to the invention are used as terms of description and not of limitation; and there is no intention in the use of such terms and expressions of excluding equivalents of the features shown and described or parts thereof, but on the contrary it is intended to include therein any and all equivalents, modifications, and adaptations which may be employed without departing from the spirit of the invention.

What is claimed is:

1. In a telephone system having an exchange and a plurality of subscribers' lines connected to said exchange, service observing apparatus comprising a first and a second register, means for repetitively scanning said lines, means effective when scanning progresses to a line over which a calling condition is initiated for registering the line number of said line over which said calling condition is initiated in said first register, means for normally disabling said second register, means for detecting any one of a plurality of electrical conditions occurring on said calling line, means effective when said calling condition is terminated in response to pre-selected ones of said electrical conditions for partially resetting said observing apparatus and for enabling said second register thereby to render said second register responsive to register the line number of lines over which subsequent requests for service are initiated, and means effective when the number in said first and second registers correspond for rendering said recorder effective to record representations of subsequent pre-selected electrical conditions occurring on said line.

2. In a telephone system having a plurality of lines and a plurality of trunks, service observing apparatus including a pair of digit registers, means responsive to a calling condition of any one of said lines for connecting said any one of said lines to one of said trunks and when said observing apparatus is otherwise idle for connecting said one of said trunks to said observing apparatus, means for registering in one of said digit registers the line number of said any one of said lines, means included in said observing apparatus responsive to a first electrical condition on said one of said trunks for partly resetting said observing apparatus and being further responsive to a second electrical condition on said one of said trunks for completely resetting said observing apparatus, means effective when said observing apparatus is partly reset for maintaining the registration of said line number in said one of said digit registers and for rendering the other of said digit registers effective during a predetermined period of time to register the line number of each line over which a request for service is initiated until said line number of said each line over which said request for service is initiated matches the line number of said any one of said lines.

3. Apparatus comprising means for sequentially generating groups of pulses severally representing items of information, a plurality of registers each adapted to register a different one of said items of information, a plurality of normally disconnected connecting means each arranged to connect a different one of said registers to said first-mentioned means, an electrically responsive device having an input terminal and a plurality of output terminals, said output terminals severally representing said registers and being rendered electrically active one-at-a-time in sequence in response to the receipt of input pulses applied to said input terminal, said sequence being advanced one terminal in response to each said pulse, means selectively interconnecting each one of said plurality of normally disconnected connecting means with a different one of said output terminals thereby to render said each one of said plurality of normally disconnected connecting means effective to inter-connect the register to which it is connected with said first-mentioned means when said different one of said output terminals is electrically active, and means effective when each of said groups of pulses terminate for generating and applying only one pulse to said input terminal.

4. Apparatus comprising means for generating pulses in sequential groups, an electrical device having an input terminal and a plurality of output terminals, means included in said device responsive to each electrical pulse applied to said input terminal for advancing an electrically-effective condition from one of said output terminals to the next of said output terminals in a predetermined sequence, said output terminals being rendered electrically effective one-at-a-time, means interconnecting said pulse-generating means with said input terminal effective when the last pulse in each group of pulses is terminated for generating and applying to said input terminal one pulse thereby to advance said electrically-effective condition one output terminal in said sequence, a plurality of counters, one for each of said sequential groups, and means including said output terminals when rendered electrically effective for selectively connecting said counters to said pulse generating means thereby to render each of said counters effective to count the pulses in a different one of said groups.

References Cited in the file of this patent

UNITED STATES PATENTS

| | | |
|---|---|---|
| 2,623,108 | Holden | Dec. 23, 1952 |
| 2,685,683 | Holden et al. | Aug. 3, 1954 |
| 2,812,385 | Joel et al. | Nov. 5, 1957 |
| 2,841,657 | Trousdale | July 1, 1958 |
| 2,848,543 | Breed et al. | Aug. 12, 1958 |
| 2,865,998 | Newstedt | Dec. 23, 1958 |
| 2,886,642 | Morris et al. | May 12, 1959 |
| 2,886,643 | Harris | May 12, 1959 |